US012603583B2

(12) United States Patent
Tange et al.

(10) Patent No.: US 12,603,583 B2
(45) Date of Patent: Apr. 14, 2026

(54) INTEGRATED GATE SIGNAL AND POWER CIRCUIT INCLUDING AN ISOLATED DC-DC CONVERTER THAT INCLUDES A NON-ISOLATED DC-DC CONVERTER

(71) Applicant: Murata Manufacturing Co., Ltd., Nagaokakyo (JP)

(72) Inventors: Takayuki Tange, Milton Keynes (GB); Frank Warnes, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 475 days.

(21) Appl. No.: 18/130,585

(22) Filed: Apr. 4, 2023

(65) Prior Publication Data

US 2023/0238892 A1 Jul. 27, 2023

Related U.S. Application Data

(63) Continuation of application No. PCT/GB2021/052572, filed on Oct. 5, 2021.

(30) Foreign Application Priority Data

Oct. 6, 2020 (GB) ...................................... 2015799

(51) Int. Cl.
  *H02M 3/335* (2006.01)
  *H02M 1/08* (2006.01)
  *H02M 7/217* (2006.01)
(52) U.S. Cl.
  CPC ......... *H02M 3/33592* (2013.01); *H02M 1/08* (2013.01); *H02M 7/217* (2013.01)

(58) Field of Classification Search
  CPC ..... H02M 3/33592; H02M 1/08; H02M 7/217
  See application file for complete search history.

(56) References Cited

U.S. PATENT DOCUMENTS 10,079,541 B1 * 9/2018 Taban ............... H02M 3/33546
2011/0316511 A1 12/2011 Wang et al.
(Continued)

FOREIGN PATENT DOCUMENTS

CN 205385403 U 7/2016
GB 2586049 A 2/2021
(Continued)

OTHER PUBLICATIONS

Official Communication issued in International Patent Application No. PCT/GB2021/052572, mailed on Mar. 25, 2022.
(Continued)

*Primary Examiner* — Rafael O De Leon Domenech
(74) *Attorney, Agent, or Firm* — Keating & Bennett, LLP

(57) ABSTRACT

An isolated DC-DC converter includes a non-isolated DC-DC converter as a primary side. The non-isolated DC-DC converter includes a first inductor, a switch controller, and first and second switches. The non-isolated DC-DC converter is configured to receive an input voltage. The non-isolated DC-DC converter also includes a secondary side including a second inductor, a full wave rectifying circuit, and a filter circuit. The second inductor in the secondary side is coupled with the first inductor in the primary side to define a transformer. The secondary side is electrically isolated from the primary side by the transformer and is configured to output a DC voltage based on a voltage induced in the second inductor via the transformer.

19 Claims, 19 Drawing Sheets

(56)            References Cited

U.S. PATENT DOCUMENTS

| | | | |
|---|---|---|---|
| 2014/0247625 A1 | 9/2014 | Hosotani | |
| 2014/0320194 A1 | 10/2014 | Rozman et al. | |
| 2016/0329815 A1 | 11/2016 | Massolini et al. | |
| 2017/0194868 A1 | 7/2017 | Choudhary et al. | |
| 2018/0041108 A1* | 2/2018 | Tanaka .................... | H02M 3/28 |
| 2019/0386561 A1 | 12/2019 | King et al. | |

FOREIGN PATENT DOCUMENTS

| | | |
|---|---|---|
| GB | 2586050 A | 2/2021 |
| GB | 2602127 A | 6/2022 |
| WO | 2013/058174 A1 | 4/2013 |

OTHER PUBLICATIONS

MPS, "5.5V, 1A, Synchronous Step-Down Converter with 25μA IQ and Output Discharge in an Ultra-Small Package", https://www.monolithicpower.com/, MP2151, Rev. 1.0, Jan. 7, 2019, pp. 1-21.

Texas Instruments, "AN-2292 Designing an Isolated Buck (Flybuck) Converter", Application Report SNVA674B, Aug. 2012—Revised May 2013, 10 pages.

Texas Instruments, "TPS61378-Q1 25-μA Quiescent Current Synchronous Boost Converter with Load Disconnect", SLVSETOA, May 2020—Revised Oct. 2020, 36 pages.

MPS, "High-Efficiency, 2A, 16V, 500kHz Synchronous, Step-Down Converter", https://www.monolithicpower.com/en/documentview/productdocument/index/version/2/document_type/Datasheet/lang/en/sku/MP1474/, MP1474, Rev. 1.0, Sep. 26, 2012, pp. 1-16.

MPS, "12A, Wide-Input 3V to 18V, 1.4MHz Synchronous Step-Down Converter with PG and External Soft Start in 3mmx3mm QFN Package", https://www.monolithicpower.com/en/documentview/productdocument/index/version/2/document_type/Datasheet/lang/en/sku/MP8774H/, MP8774H, Rev. 1.0, May 22, 2019, pp. 1-23.

MPS, "21A, High-Efficiency, Fully Integrated, Synchronous, Boost Converter with Programmable Input Current Limit", https://www.monolithicpower.com/, MP3431, Rev. 1.0, Jun. 8, 2017, pp. 1-25.

MPS, "18V, 2A, 650kHz, Synchronous Step-Down Converter with PG, SS, and Forced CCM", https://www.monolithicpower.com/, MP2332C, Rev. 1.0, Nov. 16, 2018, pp. 1-20.

MPS, "24V, 3A, 650KHz, Synchronous Step-Down Converter with PG, SS, and Forced CCM in SOT583 (1.6×2.1mm) Package", https://www.monolithicpower.com/, MP2330C, Rev. 1.0, Nov. 13, 2018, pp. 1-20.

Texas Instruments, "LM5160, LM5160A Wide Input 65-V, 2-A Synchronous Buck / Fly-Buck™ DC/DC Converter", SNVSA03E, Oct. 2014—Revised Oct. 2018, 39 pages.

Fang et al., "Isolated bias power supply for IGBT gate drives using the fly-buck converter", IEEE Applied Power Electronics Conference and Exposition (APEC), Mar. 15-19, 2015, pp. 2373-2379.

Phukan et al., "A Low Profile Gate Drive Power Supply", IEEE Applied Power Electronics Conference and Exposition (APEC), Mar. 17-21, 2019, pp. 3394-3399.

* cited by examiner

INTEGRATED GATE SIGNAL AND POWER CIRCUIT INCLUDING AN ISOLATED DC-DC CONVERTER THAT INCLUDES A NON-ISOLATED DC-DC CONVERTER

CROSS REFERENCE TO RELATED APPLICATIONS

This application claims the benefit of priority to United Kingdom Patent Application No. 2015799.6 filed on Oct. 6, 2020 and is a Continuation Application of PCT Application No. PCT/GB2021/052572 filed on Oct. 5, 2021. The entire contents of each application are hereby incorporated herein by reference.

BACKGROUND OF THE INVENTION

1. Field of the Invention

This application relates to an isolated DC-DC converter and, in particular, to an isolated DC-DC that does not require a gapped core transformer.

2. Description of the Related Art

Isolated DC-DC converters are used in various applications in modern day electronics. For example, isolated DC-DC converters are commonly found in portable consumer electrical devices powered by batteries. The electrical barrier in isolated DC-DC converters can improve safety.

There are several different isolated topologies known in the art, such as half-bridge converters, full-bridge converters, push-pull converters, and forward converters, which all require designated integrated circuits (ICs). However, there are few solutions that provide isolated buck or boost converter ICs.

FIG. 1 shows one example of a known isolated buck (flybuck) type converter 100. The flybuck converter 100 includes a synchronous buck converter acting as the primary side 102 and a secondary side 104. The primary side 102 includes a switching circuit 106 that includes a high-side buck switch Q1 and a low-side switch Q2. The primary side 102 includes an output voltage $V_{OUT1}$. The primary side and secondary side are coupled via the transformer formed from the inductor 108 in the primary side 102 and the inductor 110 in the secondary side 104. The output of the secondary side $V_{OUT2}$ is isolated from the primary side 102 via the transformer.

The topology of FIG. 1 has a number of problems. Most notably, saturation in the transformer formed by the coupled inductors 108, 110 during the Q1 ON stage should be avoided to ensure correct functioning of the converter. This means that a transformer with a gapped core is often required in the configuration of FIG. 1, particularly in the case of high voltage and/or low frequency applications. Gapped cores typically lead to a more complex construction and add additional expense. Alternatively, a larger core and/or more windings can be used in order to avoid saturation of the transformer core. However, this leads to a bulkier device.

Another drawback with the configuration of FIG. 1 is that the ripple voltage and noise in the output voltage $V_{OUT2}$ are large. This is because energy is only provided to the $V_{OUT2}$ terminal when the high-side buck switch Q1 is off and the low-side switch Q2 is on.

It is appreciated that it would be desirable to provide an improved isolated buck or boost DC-DC converter that is resistant to saturation in the transformer core and that mitigates noise in the output signal.

SUMMARY OF THE INVENTION

Preferred embodiments of the present invention provide an improved isolated DC-DC converter that does not require use of a gapped core to prevent saturation in the transformer. Instead, a ring shape core can be used, providing a simple and effective structure. Moreover, energy is provided to the isolated output voltage on the secondary side during both the on and off period of the primary side converter. Therefore, the ripple voltage and noise in the isolated output will be reduced. Furthermore, a dedicated IC is not required; instead, various non-isolated DC-DC converter ICs can be used. Therefore, the cost of the isolated DC-DC converter can be reduced.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

This application relates to an isolated DC-DC converter. The isolated DC-DC converter includes a non-isolated DC- DC converter as a primary side. The non-isolated DC-DC converter includes a first inductor, a switch controller, and first and second switches. The non-isolated DC-DC converter is configured to receive an input voltage. The non-isolated DC-DC converter also includes a secondary side including a second inductor, a full wave rectifying circuit, and a filter circuit. The second inductor in the secondary side is coupled with the first inductor in the primary side to define a transformer. The secondary side is electrically isolated from the primary side by the transformer and is configured to output a DC voltage based on a voltage induced in the second inductor via the transformer.

First Preferred Embodiment

Figure 2:
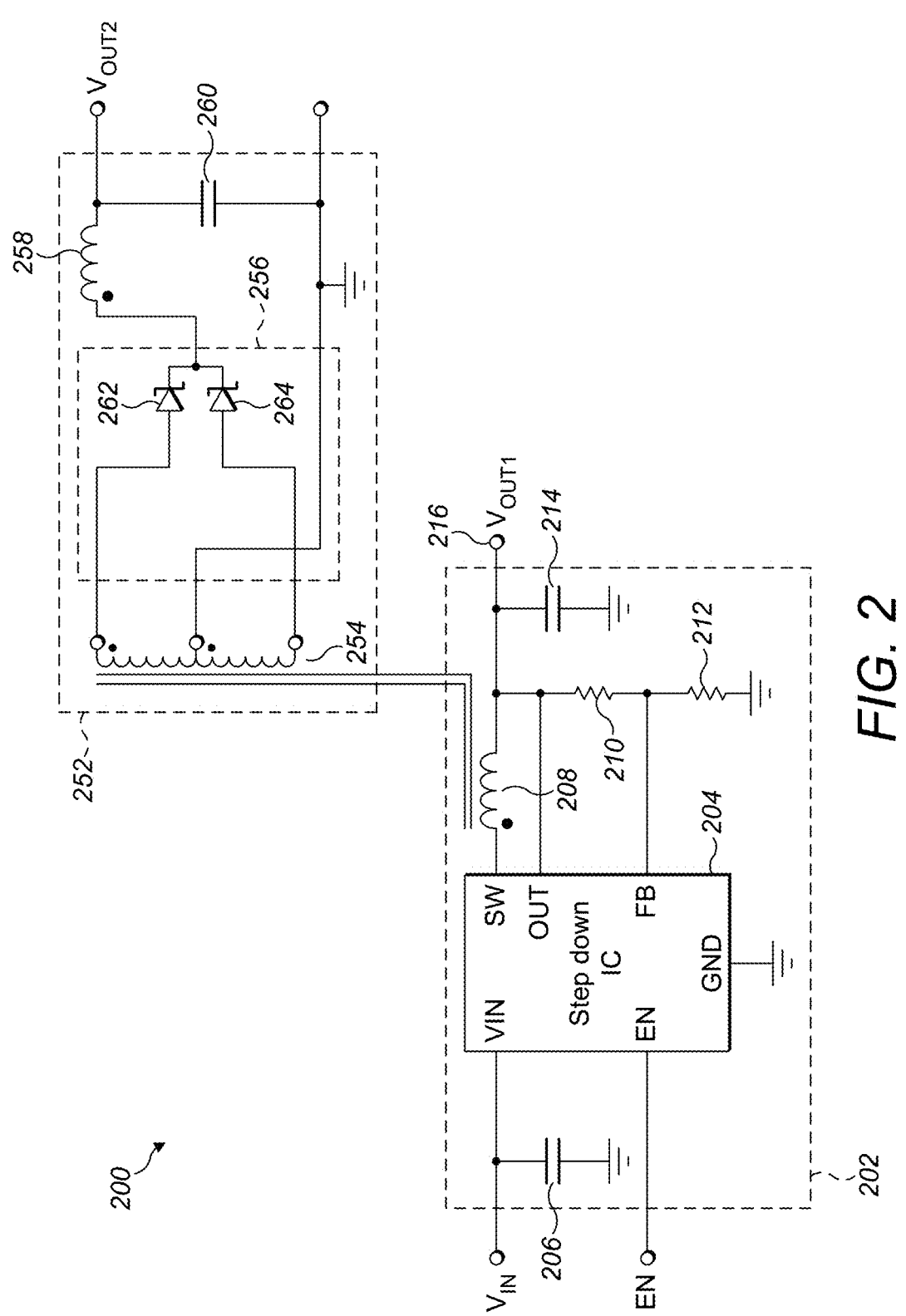
FIG. 2 shows an isolated DC-DC converter of a first preferred embodiment of the present invention.

FIG. 2 shows an isolated DC-DC converter 200 of a first preferred embodiment of the present invention. The converter 200 includes a non-isolated buck converter as a primary side 202, and a secondary side 252 that is isolated from and controlled by the primary side 202.

In general, any buck converter could be used as the primary side 202. Typically, buck converters contain switched-mode power supply (SMPS) integrated circuits (ICs). As an example, in this preferred embodiment, a Monolithic Power Systems® MP2151 synchronous step-down converter is used as the step-down IC 204 in the primary side 202. Further details of the operation of the MP2151 IC can be found in the MP2151 datasheet at https://www.monolithicpower.com/en/documentview/pro-ductdocument/index/version/2/document_type/Datasheet/lang/en/sku/MP2151/, which is hereby incorporated by reference. A summary of the functions of the step-down IC 204 are given in Table 1 below.

TABLE 1

Pin functions of the step-down IC 204.

| Name | Description |
| --- | --- |
| GND | System Ground. Reference ground of the regulated output voltage. |
| SW | Converter switch. SW is connected to the drain of the internal low-side power MOSFET and the source of the internal high-side synchronous power MOSFET. |
| VIN | Supply Voltage. The IN pin supplies power for internal MOSFET and regulator. |
| FB | Feedback. An external resistor divider from the output to GND tapped to FB sets the output voltage. |
| OUT | Output sense. OUT is the voltage power rail and input sense pin for the output voltage. |
| EN | On/off control. |

In the preferred embodiment of FIG. 2, an input voltage $V_{IN}$ is input into the VIN terminal of the step-down IC 204, and the VIN terminal is connected to ground via a first capacitor 206. The SW terminal is connected to one end of a first inductor 208. The other end of the first inductor 208 is connected to the OUT terminal of the step-down IC 204 and is connected to ground via a first resistor 210 and a second resistor 212 in series. The other end of the first inductor 208 is also connected to ground via a second capacitor 214 and is connected to an output terminal 216. The FB terminal is connected to the midpoint between the first and second resistors 210, 212, and the GND terminal is connected to ground. In one particular preferred embodiment, the first capacitor 206 and second capacitor 214 have a capacitance of 10 μF, but other capacitance values can be used.

The primary side 202 functions as a buck converter. The output voltage $V_{OUT1}$ is set by the FB terminal and the first and second resistors 210, 212. The FB terminal is connected to the midpoint of the voltage divider formed by the first and second resistors 210, 212, and the voltage at the FB terminal is always maintained at an internal reference voltage (For example, 0.7 V but other reference values can be used) set by an internal operational amplifier (op amp) in the step-down IC 204. This feedback circuit controls the switching timing (duty cycle) of each of the switches in the step-down IC 204 based on the resistance values of the first and second resistors 210, 212. The duty cycles of the switches set the output voltage $V_{OUT1}$ at the output terminal 216 of the primary side, as will be explained in more detail below. The second capacitor 214 stabilizes the output voltage $V_{OUT1}$ of the primary side. The output voltage $V_{OUT1}$ at the terminal 216 of the primary side is non-isolated.

As mentioned, any buck converter can be used as the primary side 202. The inductor of the buck converter, in this case the first inductor 208, is coupled to a second inductor 254 in the secondary side 252, such that the first inductor 208 and the second inductor 254 define a transformer. The first inductor 208 and second inductor 254 may typically be formed from coils. The first inductor 208 and the second inductor 254 are coupled via a magnetic core. The first inductor 208 forms the primary windings of the transformer, and the second inductor 254 forms the secondary windings of the transformer. The secondary side 252 is electrically isolated from the primary side 202 by the transformer. In the preferred embodiment of FIG. 2, the primary and secondary windings of the transformer have the same polarity.

The secondary side 252 also includes a rectifying circuit 256, a third inductor 258, and a third capacitor 260. In this preferred embodiment, the rectifying circuit 256 is a two diode center-tapped full wave rectifier that includes a first diode 262, a second diode 264, and a center-tap halfway along the second inductor 254 which is connected to ground. The anode of the first diode 262 and the anode of the second diode 264 are connected to opposite ends of the second inductor 254. The cathode of the first diode 262 and the cathode of the second diode 264 are connected to one end of the third inductor 258. The third capacitor 260 is connected between the output at the other end of the third inductor 258 and ground. The voltage over the third capacitor 260 is the isolated output voltage $V_{OUT2}$ of the isolated DC-DC converter 200. The isolated DC-DC converter 200 therefore includes two independent outputs. The first is the non-isolated stepped down output voltage $V_{OUT1}$ of the buck converter of the primary side 202 at the output terminal 216. The second output is the output voltage $V_{OUT2}$ of the secondary side 252 that is isolated by virtue of the transformer.

The step-down IC 204 in the primary side 202 includes a switch controller, and a high-side switch Q1 and a low side switch Q2, as typically found in a buck converter. The switches are MOSFETs in the case of the MP2151 step-down IC, but other types of switches can be used. When switch Q1 is on and switch Q2 is off, the current through first inductor 208 increases. This induces a voltage in the second inductor 254 that causes a current loop to flow through the upper half of the second inductor 254, the first diode 262, the third inductor 258, and the third capacitor 260 and to return to the second inductor 254 via the center-tap. Energy is therefore transferred from the first inductor 208 to the third inductor 258 when switch Q1 is on and switch Q2 is off. The second diode 264 is reverse biased such that current is prevented from flowing through the lower half of the second inductor 254 when switch Q1 is on and switch Q2 is off.

After switching by the step-down IC 204, Q1 is off and Q2 is on, and the current through the first inductor 208 decreases. This induces a voltage in the second inductor 254 that causes a current loop to flow through the lower half of the second inductor 254, the second diode 264, the third inductor 258, the third capacitor 260, and return to the second inductor 254 via the center-tap. Energy is therefore also transferred from the first inductor 208 to the third inductor 258 when switch Q1 is off and switch Q2 is on. The first diode 262 is reverse biased such that current is prevented from flowing through the upper half of the second inductor 254 when switch Q1 is off and switch Q2 is on.

Figure 1:
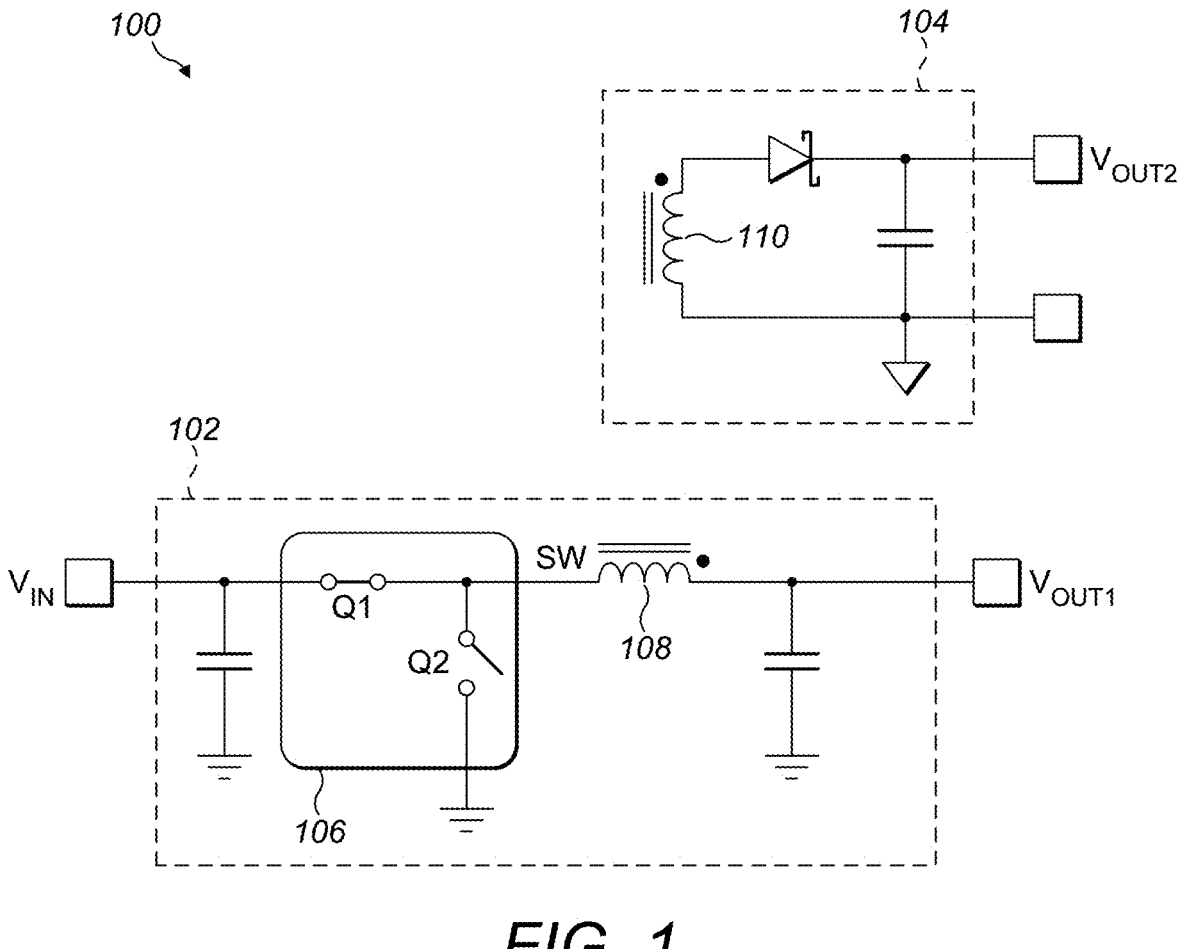
FIG. 1 shows an isolated buck converter of the prior art.

Unlike the flybuck converter of FIG. 1, which stores energy in the transformer core during the Q1 ON, Q2 OFF time, and transfers this energy to the secondary side during the Q1 OFF, Q2 ON time, the isolated DC-DC converter of the present preferred embodiment transfers energy from the first inductor 208 in the primary side to the second inductor 254 in the secondary side 252 during both the Q1 ON, Q2 OFF phase, and the Q1 OFF, Q2 ON phase. In other words, a current flows both in the first inductor 208 and in the second inductor 254 when switch Q1 is on and switch Q2 is off, and also when switch Q1 is off and switch Q2 is on. Therefore, saturation of the transformer is prevented as energy is not stored in the transformer core, and therefore, a gapped core in the transformer is not required. Instead, a ring shape core can be used, providing a simple and effective structure.

Moreover, as the energy is provided to the $V_{OUT2}$ terminal on the secondary side 252 during both the Q1 ON, Q2 OFF phase, and the Q1 OFF, Q2 ON phase of the primary side converter 202, the ripple voltage and the noise in the output $V_{OUT2}$ of the secondary side 252 will be reduced, compared to a configuration such as that in FIG. 1.

A dead time operation can be introduced to the switching pattern of the step-down IC 204. This is where both Q1 and Q2 are turned off momentarily before each time either of the switches is turned on. In this dead time, no power transmission occurs between the primary side 202 and the secondary side 252. This can protect the switches Q1 and Q2 in the step-down IC 204.

The third inductor 258 and the third capacitor 260 define a filter circuit, which filters the output of the second inductor 254 to produce the isolated output voltage $V_{OUT2}$ The third capacitor 260 acts as a shunt capacitor to produce the DC voltage $V_{OUT2}$ at the load. The third inductor 258 averages the voltage from the second inductor 254.

The isolated output voltage $V_{OUT2}$ of the secondary side 252 is set based on the switching timing (duty cycle) of the step-down IC 204, and on the ratio of the number of turns between the first inductor 208 and each half of the second inductor 254. The duty cycles of the switches in the step-down IC 204 are controlled by the feedback terminal on the step-down IC 204. The duty cycle of the high-side Q1 switch sets the non-isolated output of the primary side 202. The ratio of the non-isolated output voltage $V_{OUT1}$ of the primary side to the input voltage $V_{IN}$ is equal to the duty cycle of the Q1 switch (D):

$$V_{OUT1}/V_{IN}=D$$

For example, if the duty cycle is set to 50% or approximately 50%, the non-isolated output voltage $V_{OUT1}$ at the output terminal 216 will be half or approximately half the input voltage $V_{IN}$. The isolated output voltage $V_{OUT2}$ is then set based on the turns ratio. If the first inductor 208 and each half of the second inductor 254 include the same number of turns, then the isolated output voltage $V_{OUT2}$ will be the same as the non-isolated output voltage $V_{OUT1}$ of the primary side 202.

Unlike in other known isolated DC-DC converters, in the present preferred embodiment, a dedicated IC is not required. Instead, various non-isolated DC-DC converter ICs, such as the MP2151 IC, can be used as the primary side 202. Therefore, the cost of the isolated DC-DC converter can be reduced.

Second Preferred Embodiment

Figure 3:
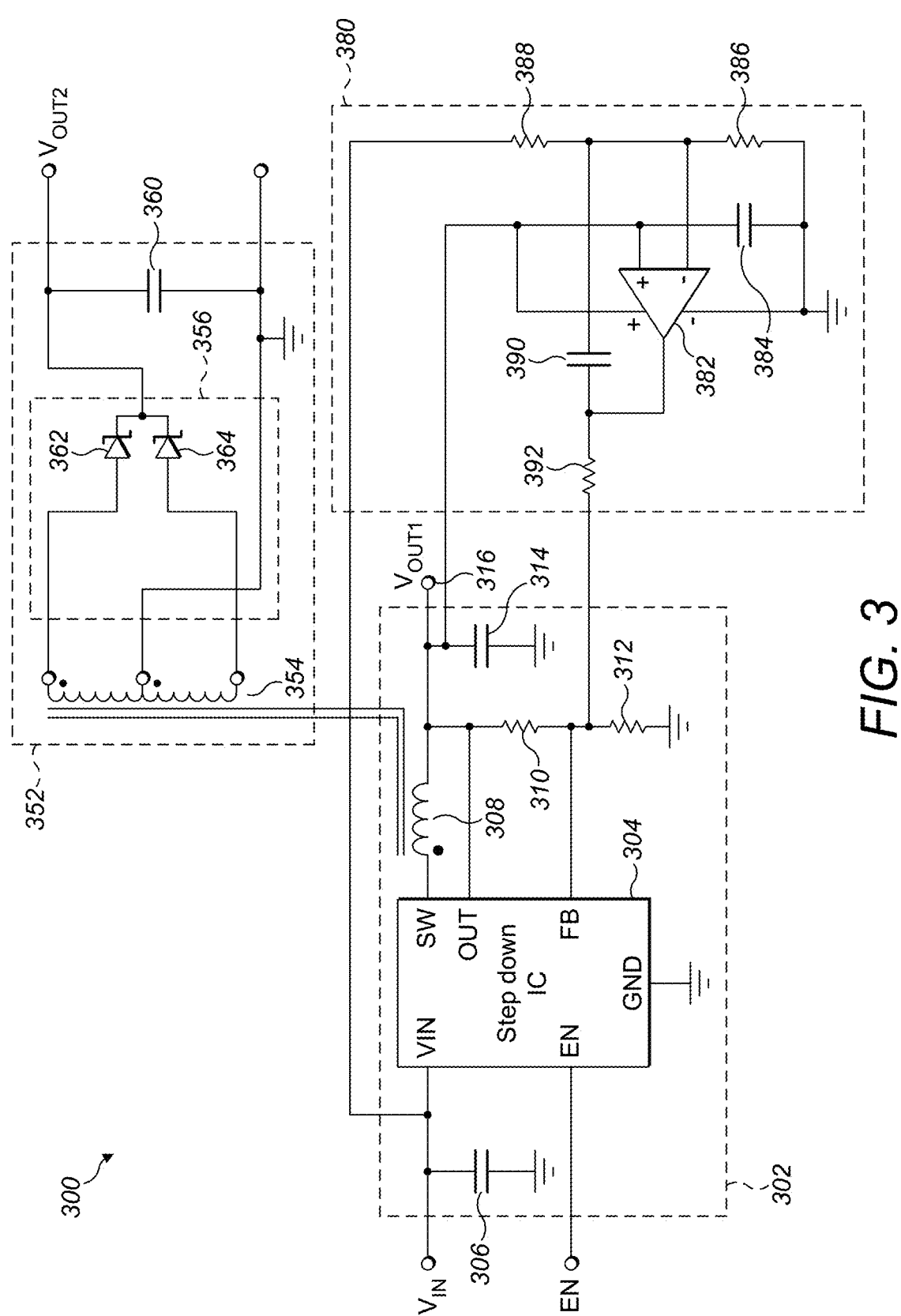
FIG. 3 shows an isolated DC-DC converter of a second preferred embodiment of the present invention.

FIG. 3 shows an isolated DC-DC converter 300 of a second preferred embodiment of the present invention. The isolated DC-DC converter 300 includes a primary side 302 and a secondary side 352. The primary side 302 of the second preferred embodiment is identical to the primary side 202 of the first preferred embodiment and functions in the same way. A repeat of the description of the primary side 302 will therefore be omitted. The secondary side 352 of the second preferred embodiment is similarly identical to the secondary side 252 of the first preferred embodiment, except that the third inductor 258 has been removed in the second preferred embodiment.

The isolated DC-DC converter 300 of the second preferred embodiment further includes a duty regulating circuit 380. The duty regulating circuit 380 includes an amplifying circuit. In FIG. 3, the amplifying circuit is an op amp 382. The non-inverting input and the positive power supply terminal of the op amp 382 are connected to the output of the first inductor 308 of the primary side 302. In other words, the non-isolated output voltage $V_{OUT1}$ of the primary side buck converter (at the output terminal 316) is input into the non-inverting input and the positive power supply terminal of the op amp 382. The negative power supply terminal of the op amp 382 is connected to ground. The non-inverting input of the op amp 382 is connected to ground via a fourth capacitor 384. The inverting input of the op amp 382 is connected to ground via a third resistor 386 and is connected to the VIN terminal of the step-down IC 304 via a fourth resistor 388. The output terminal of the op amp 382 is connected to the midpoint of the third resistor 386 and the fourth resistor 388, and therefore, to the inverting input of the op amp 382, via fifth capacitor 390. The output terminal of the op amp is also connected to the midpoint of the first and second resistors 310, 312 of the primary side 302 via a fifth resistor 392.

The duty regulating circuit 380 is included to maintain the duty cycle of the step-down IC 304 at 50% or approximately 50%, including when the input voltage $V_{IN}$ is changed. The op amp 382 of the duty regulating circuit monitors the input voltage $V_{IN}$ and the output voltage $V_{OUT1}$ of the primary side 302. The inverting input of the op amp 382 receives half of the input voltage $V_{IN}$, the input voltage $V_{IN}$ being divided equally between the third and fourth resistors 386, 388. The non-inverting input receives the output voltage $V_{OUT1}$ The op amp 382 outputs a feedback signal into the FB terminal via the fifth resistor 392, which maintains the duty cycle of the step-down IC 304 at 50% or approximately 50% and, therefore, ensures the output voltage $V_{OUT1}$ is equal to half of the input voltage, even when the input voltage is varied.

When the duty regulating circuit 380 maintains the duty cycle of the step-down IC 304 at 50% or approximately 50%, and the first inductor 308 includes the same number of turns as each half of the second inductor 354 (the transformer ratio is equal to 1), and when the transformer is well coupled, the output voltage $V_{OUT2}$ of the secondary side 352 is stable without an inductor on the secondary side. Therefore, the third inductor 258 is not required in this preferred embodiment, although it may optionally be included. In the second preferred embodiment with third inductor 258 not included, the third capacitor 360 alone forms the filter circuit. Otherwise, the secondary side 352 of the second preferred embodiment operates in the same way as the first preferred embodiment, with the third capacitor 360 acting as a shunt capacitor.

The advantages of the second preferred embodiment are the same as in the first preferred embodiment, namely, negating the need for a gapped core and reducing the ripple voltage and noise in the output. Maintaining the duty cycle at 50% or approximately 50% means that the third inductor 258 on the secondary side can be removed, which reduces the size and cost of the DC-DC converter. In addition, without the third inductor 258, if the switching frequency in the IC matches the resonance frequency of the second capacitor 314 and leakage inductance of the first inductor 308 in the primary side, load regulation is 0% in the ideal case.

A small tolerance in the duty cycle, 13es example, ±1%, is acceptable if the voltage ripple in the output voltage $V_{OUT2}$ is within an acceptable range.

Third Preferred Embodiment

Figure 4:
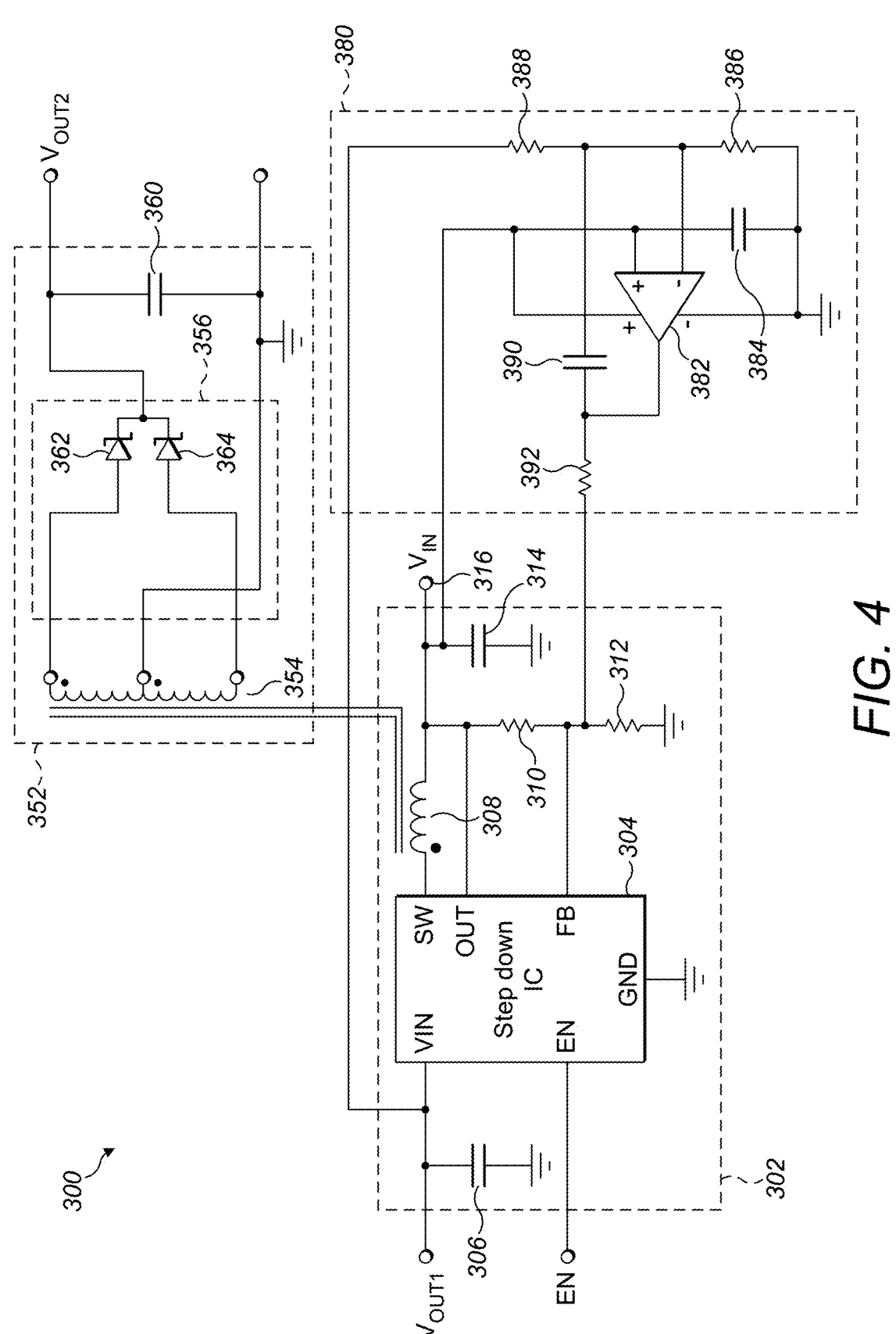
FIG. 4 shows an isolated DC-DC converter of a third preferred embodiment of the present invention.

FIG. 4 shows an isolated DC-DC converter of a third preferred embodiment of the present invention. The isolated DC-DC converter in the third preferred embodiment is structurally the same as the isolated DC-DC converter 300 in the second preferred embodiment. The only difference in the third preferred embodiment is that the input voltage $V_{IN}$ is input into the output terminal 316 rather than into the VIN terminal of the step-down IC 304.

The secondary side 352 and the duty regulating circuit 380 operate in the same way as in the second preferred embodiment. However, as the input voltage $V_{IN}$ is directly input into the output terminal 316 the primary side 302 operates as a boost converter. Therefore, the ratio of the input voltage $V_{IN}$ (at the output terminal 316) to the non-isolated output voltage $V_{OUT1}$ (at the VIN terminal) is equal to 1 minus the duty cycle of the high-side Q1 switch:

$$V_{IN}/V_{OUT1}=1-D$$

For example, for a 50% duty cycle or approximately 50% duty cycle in the step-down IC 304, the primary side 302 in fact steps up the input voltage $V_{IN}$ by a factor of two or approximately two. The isolated output voltage $V_{OUT2}$ on the secondary side is then set by the stepped up non-isolated output voltage $V_{OUT1}$ on the primary side, adjusted based on the turns ratio in the transformer.

The configuration of the third preferred embodiment can therefore be used to provide a stepped up isolated output voltage. As described in the second preferred embodiment, the duty regulating circuit maintains the duty cycle of the step-down IC 304 at 50% or approximately 50% when the input voltage $V_{IN}$ is changed, meaning an inductor is not required in the filter circuit on the secondary side.

The advantages of the third preferred embodiment are the same as in the previous preferred embodiments, namely saturation of the transformer is again prevented as energy is not stored in the transformer core during operation, and therefore, a gapped core is not required.

Fourth Preferred Embodiment

Figure 5:
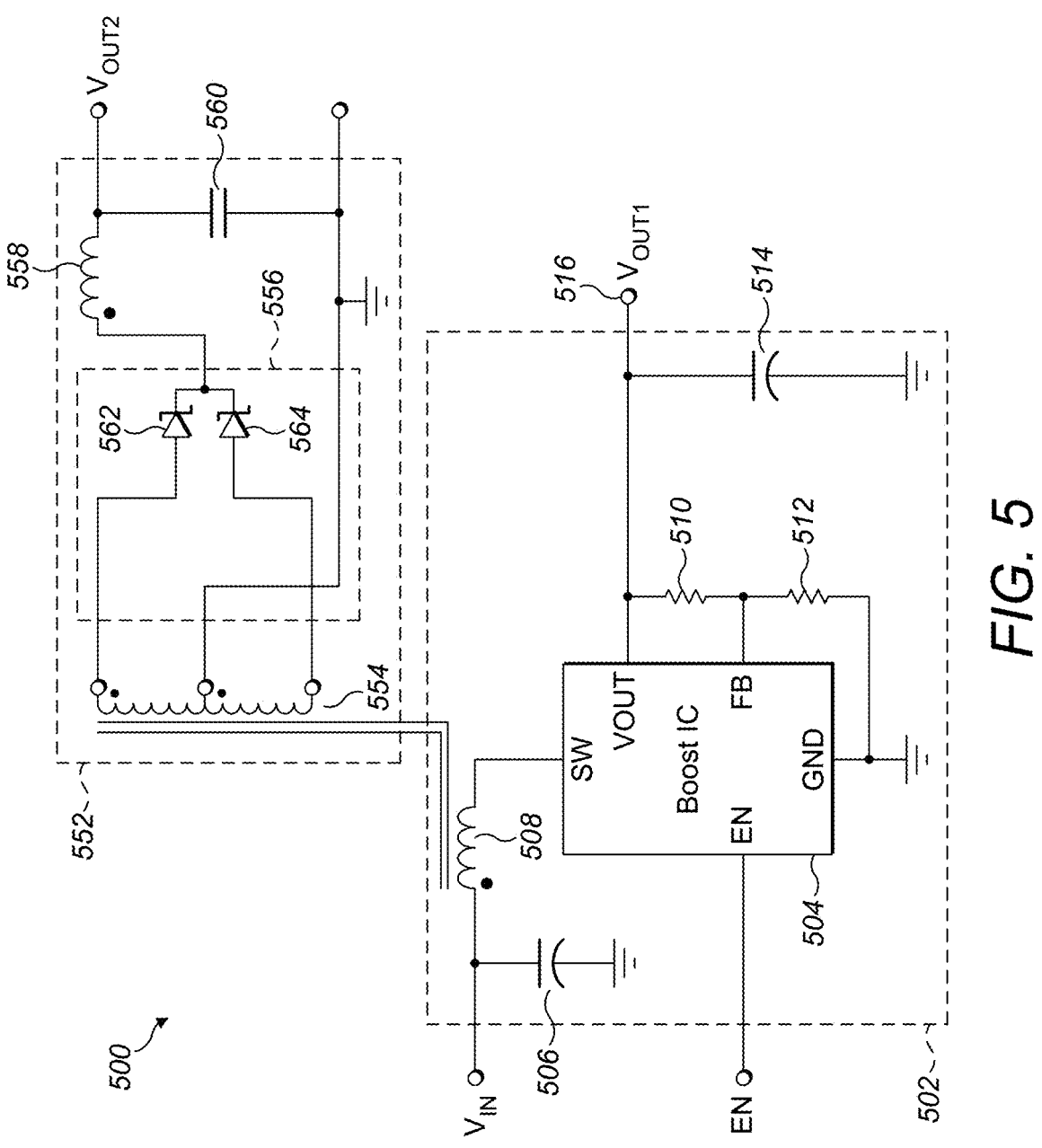
FIG. 5 shows an isolated DC-DC converter of a fourth preferred embodiment of the present invention.

FIG. 5 shows an isolated DC-DC converter 500 of a fourth preferred embodiment of the present invention. The isolated DC-DC converter 500 includes a non-isolated boost (step-up) converter as a primary side 502, and a secondary side 552 that is isolated from and controlled by the primary side 502. The secondary side 552 of the fourth preferred embodiment is identical to the secondary side 252 of the first preferred embodiment, and a repeat of the description of the secondary side will therefore be omitted.

In general, any boost converter could be used as the primary side 502. As an example, in this preferred embodiment a Texas Instruments® TPS61378 synchronous boost converter is used as the boost IC 504 in the primary side 502. The pin function descriptions given in Table 1 in the first preferred embodiment are also applicable to the boost IC 504 of the second preferred embodiment. In addition, the boost IC 504 includes an output pin, labelled VOUT. Further details of the operation of the TPS61378 IC can be found in the TPS61378 datasheet at https://www.ti.com/lit/ds/symlink/tps61378-q1.pdf?ts=1600251088700&ref_url=https%253A%252F%252Fwww.google.com%252F, which is hereby incorporated by reference.

In the preferred embodiment of FIG. 5, an input voltage $V_{IN}$ is input into a first end of a first inductor 508. The first end of the first inductor 508 is also connected to ground via a first capacitor 506. The other end of the first inductor 508 is connected to the SW terminal of the boost IC 504. The VOUT terminal of the boost IC 504 is connected to the output terminal 516, is connected to ground via a second capacitor 514, and is connected to ground via a first resistor 510 and a second resistor 512 in series. The FB terminal is connected to the midpoint between the first and second resistors 510, 512, and the GND terminal is connected to ground. In one particular preferred embodiment, the first capacitor 506 and second capacitor 514 have a capacitance of 10 µF, but other capacitance values can be used.

The primary side 502 functions as a boost converter. The boost IC 504 includes a switch controller and first and second switches. Switching of the first and second switches in the boost IC 504 sets the output voltage $V_{OUT1}$ at the output terminal 516 of the primary side. The output voltage $V_{OUT1}$ is set by the feedback circuit formed by the first and second resistors 510, 512, in a similar fashion to the first preferred embodiment. The second capacitor 514 stabilizes the output voltage $V_{OUT1}$ of the primary side. The output voltage $V_{OUT1}$ at the terminal 516 of the primary side is non-isolated.

As mentioned, any boost converter could be used as the primary side 502. The inductor of the boost converter, in this case, the first inductor 508, is coupled to the second inductor 554 in the secondary side 552 via a magnetic core in a similar fashion to as described in the first preferred embodiment, such that the first inductor 508 and the second inductor 554 define a transformer. In the preferred embodiment of FIG. 4, the primary and secondary windings of the transformer have the same polarity. The isolated DC-DC converter 500 again includes two independent outputs, the non-isolated output voltage $V_{OUT1}$ of the boost converter of the primary side 502 at the output terminal 516, and the output voltage $V_{OUT2}$ of the secondary side 552 that is isolated by virtue of the transformer.

The secondary side 552 operates in a similar fashion to the secondary side 252 of the first preferred embodiment. Namely, when the high-side switch Q1 in the boost IC 504 is on and the low-side switch Q2 is off, the current through the first inductor 508 decreases. This induces a voltage in the second inductor 554 that causes a current loop to flow through the lower half of the second inductor 554, the second diode 564, the third inductor 558, and the third capacitor 560 and to return to the second inductor 554 via the center-tap. When the high-side switch Q1 is off and switch Q2 is on, the current through the first inductor 508 increases. This induces a voltage in the second inductor 554 that causes a current loop to flow through the upper half of the second inductor 554, the first diode 562, the third inductor 558, and the third capacitor 560 and to return to the second inductor 554 via the center-tap.

As in the first preferred embodiment, the isolated DC-DC converter 500 of the present preferred embodiment transfers energy from the first inductor 508 in the primary side, to the third inductor 558 in the secondary side 552, during both the Q1 ON, Q2 OFF phase, and the Q1 OFF, Q2 ON phase. Therefore, a gapped core is not required to prevent saturation in the transformer. Instead, a ring shape core can be used, providing a simple and effective structure.

Moreover, the energy is provided to the $V_{OUT2}$ terminal on the secondary side 552 during both the Q1 ON, Q2 OFF phase, and the Q1 OFF, Q2 ON phase of the primary side converter 502. Therefore, the ripple voltage and the noise in the output $V_{OUT2}$ of the secondary side 552 will be reduced.

The non-isolated output voltage $V_{OUT1}$ of the primary side 502 and the isolated output voltage $V_{OUT2}$ of the secondary side 552 are again set based on the duty cycle of the boost IC and transformer turns ratio. Similar to the third preferred embodiment, the input voltage $V_{IN}$ is input directly into the transformer, and the non-isolated output voltage $V_{OUT1}$ is therefore stepped up based on the formula:

$$V_{IN}/V_{OUT1}=1-D$$

Unlike in other known isolated DC-DC converters, a dedicated IC is not required. Instead, various non-isolated DC-DC converter ICs, such as the TPS61378 IC, can be used as the primary side 502. Therefore, the cost of the isolated DC-DC converter can be reduced.

Fifth Preferred Embodiment

Figure 6:
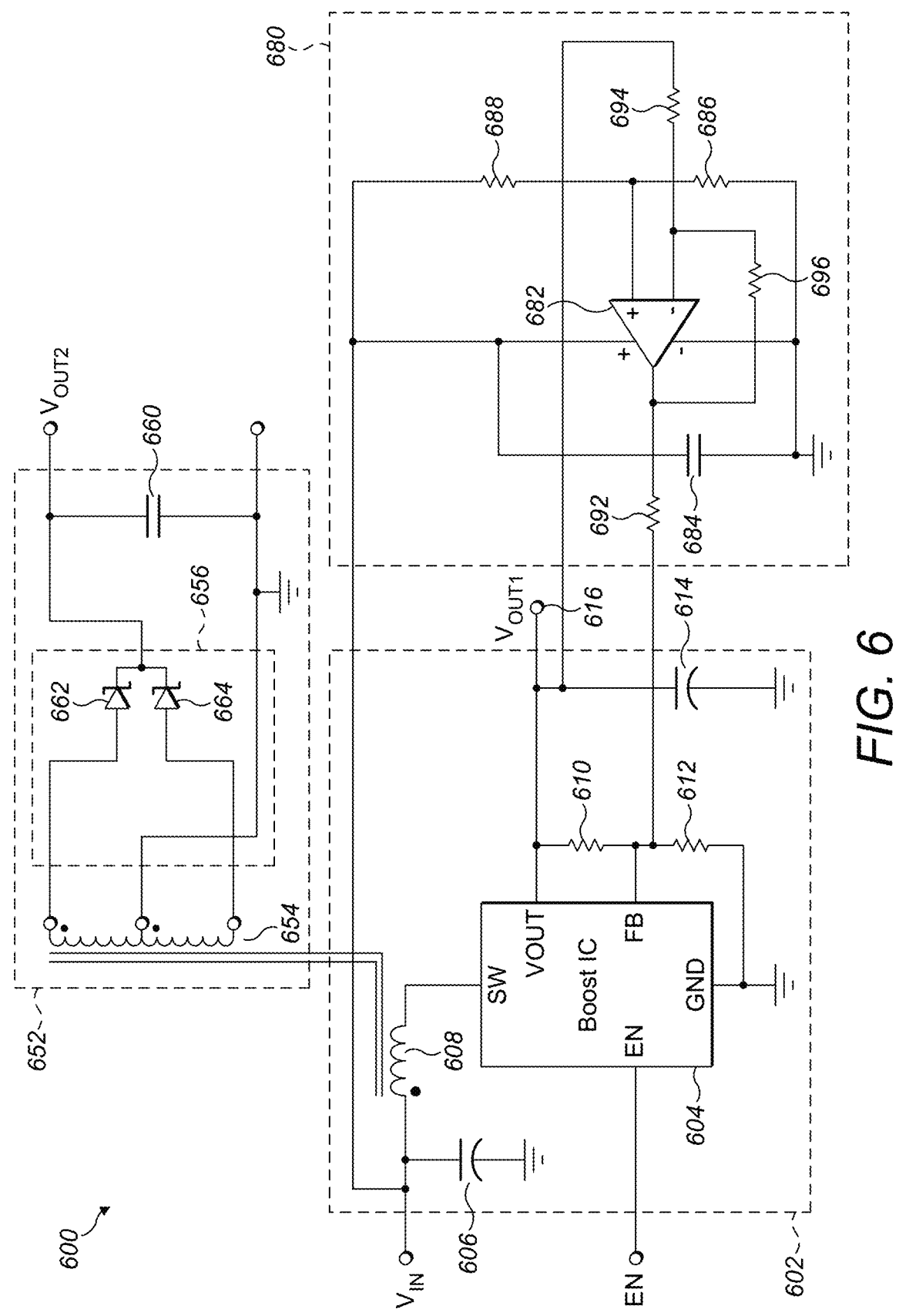
FIG. 6 shows an isolated DC-DC converter of a fifth preferred embodiment of the present invention.

FIG. 6 shows an isolated DC-DC converter 600 of a fifth preferred embodiment of the present invention. The isolated DC-DC converter 600 is the same as the isolated DC-DC converter 500 of the fourth preferred embodiment, except that the third inductor 558 has been removed, and a duty regulating circuit 680 has been included instead.

The duty regulating circuit 680 includes an op amp 682 as the amplifying circuit. The positive power supply terminal of the op amp 682 is connected to the input voltage $V_{IN}$. The positive power supply terminal is also connected to ground via a fourth capacitor 684. The negative power supply terminal of the op amp 682 is connected to ground. The non-inverting input of the op amp 682 is connected to ground via a third resistor 686 and is connected to the input voltage $V_{IN}$ via a fourth resistor 688. The output terminal of the op amp 682 is connected to the FB terminal of the boost IC 604 via fifth resistor 692. The inverting input of the op amp 682 is connected to the output terminal 616 of the boost IC 604 via a sixth resistor 694 and is connected to the output terminal of the op amp via a seventh resistor 696.

The duty regulating circuit 680 operates in a similar fashion to the duty regulating circuit 380 of the second preferred embodiment, to maintain the duty cycle of the boost IC 604 at 50% or approximately 50%, including when the input voltage $V_{IN}$ is changed. Namely, the inverting input of the op amp 682 monitors the input voltage $V_{IN}$ via the third and fourth resistors 686, 688, and the output voltage $V_{OUT1}$ of the primary side 602 is monitored via the non-inverting input. The op amp 682 outputs a feedback signal into the FB terminal via the fifth resistor 692, which maintains the duty cycle of the boost IC 604 at 50% or approximately 50% and, therefore, ensures the output voltage $V_{OUT1}$ is equal to half of the input voltage, even when the input voltage is varied.

When the duty regulating circuit 680 maintains the duty cycle of the boost IC 604 at 50% or approximately 50%, and the first inductor 608 has the same number of turns as each half of the second inductor 654 (the transformer ratio is equal to 1), and when the transformer is well coupled, the output voltage $V_{OUT2}$ of the secondary side 652 is again stable without an inductor in the filter circuit on the secondary side.

The advantages of the fifth preferred embodiment are the same as in the previous preferred embodiments, namely, negating the need for a gapped core and reducing the ripple voltage and noise in the output, as well as reducing the size and cost of the device.

Sixth Preferred Embodiment

Figure 7:
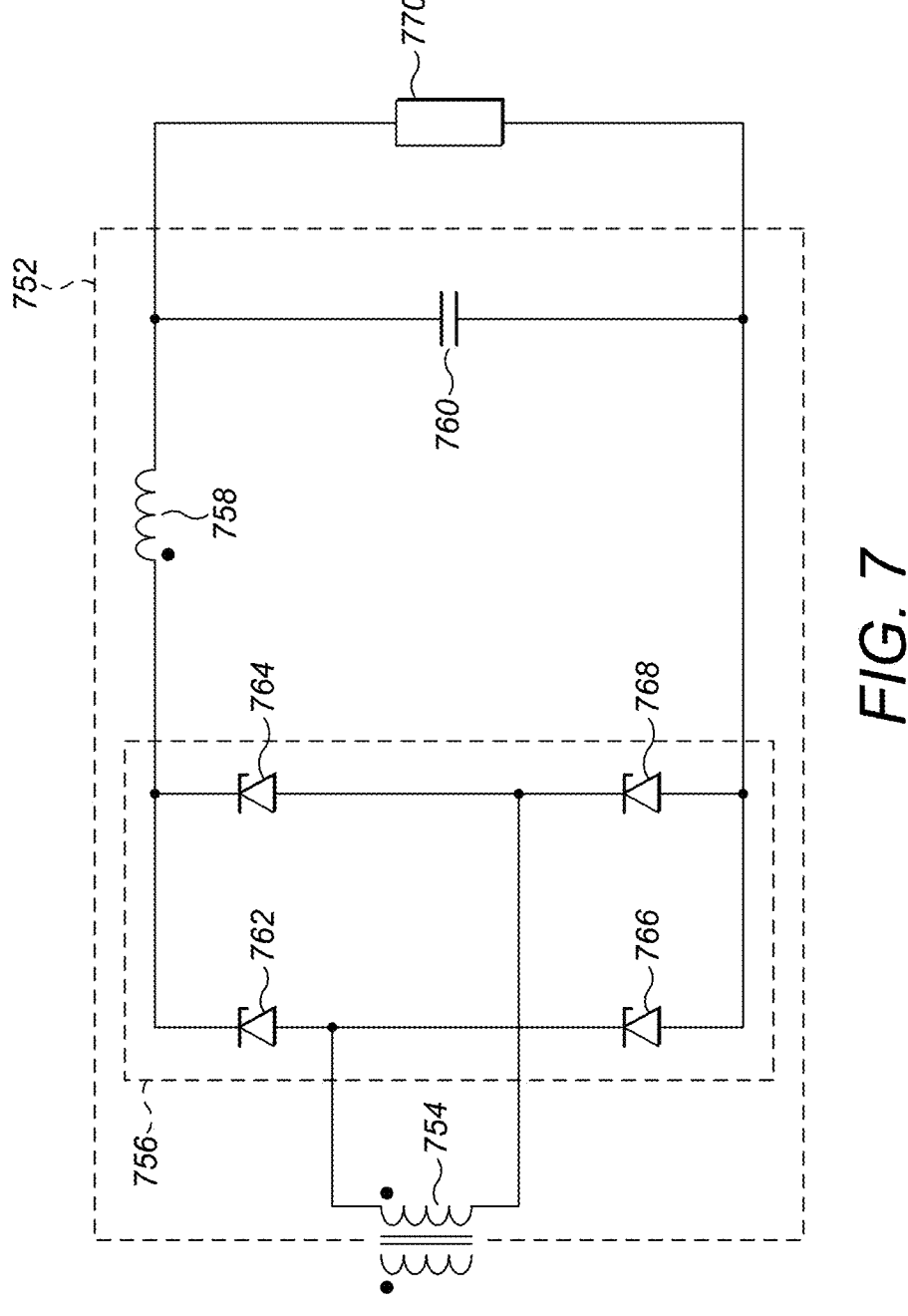
FIG. 7 shows an alternative secondary side used in a sixth preferred embodiment of the present invention.

FIG. 7 shows an alternative secondary side 752 used in a sixth preferred embodiment of the present invention. The sixth preferred embodiment is the same as either the first or fourth preferred embodiments, except that the secondary side 752 of FIG. 7 is used instead of the secondary side shown in either of FIG. 2 or 5. The secondary side 752 of FIG. 7 includes an alternative rectifying circuit.

In the sixth preferred embodiment, as with the previous preferred embodiments, the inductor of the primary side is coupled to the second inductor 754 in the secondary side 752 via a magnetic core so as to define a transformer. The secondary side 752 includes a rectifying circuit 756, a third inductor 758, and a third capacitor 760. In the sixth preferred embodiment, the rectifying circuit 756 is a full wave bridge rectifier that includes a first diode 762, a second diode 264, a third diode 766, and a fourth diode 768. The anode of the first diode 762 and the anode of the second diode 764 are connected to opposite ends of the second inductor 754. The cathode of the first diode 762 and the cathode of the second diode 764 are connected to one end of the third inductor 758. The cathode of the third diode 766 and the cathode of the fourth diode 768 are connected to the anode of the first diode 762 and the anode of the second diode 764 respectively. The anode of the third diode 766 and the anode of the fourth diode 768 are connected to the other end of the third inductor 758 via the third capacitor 760. The voltage over the third capacitor 760 is the isolated output voltage $V_{OUT2}$ of the isolated DC-DC converter. In FIG. 7, this output voltage is shown connected over a load resistance 770, which is connected in parallel to the third capacitor 760.

The secondary side 752 of FIG. 7 functions analogously to the secondary side of the first or fourth preferred embodiments in FIG. 2 or 5.

Seventh Preferred Embodiment

Figure 8:
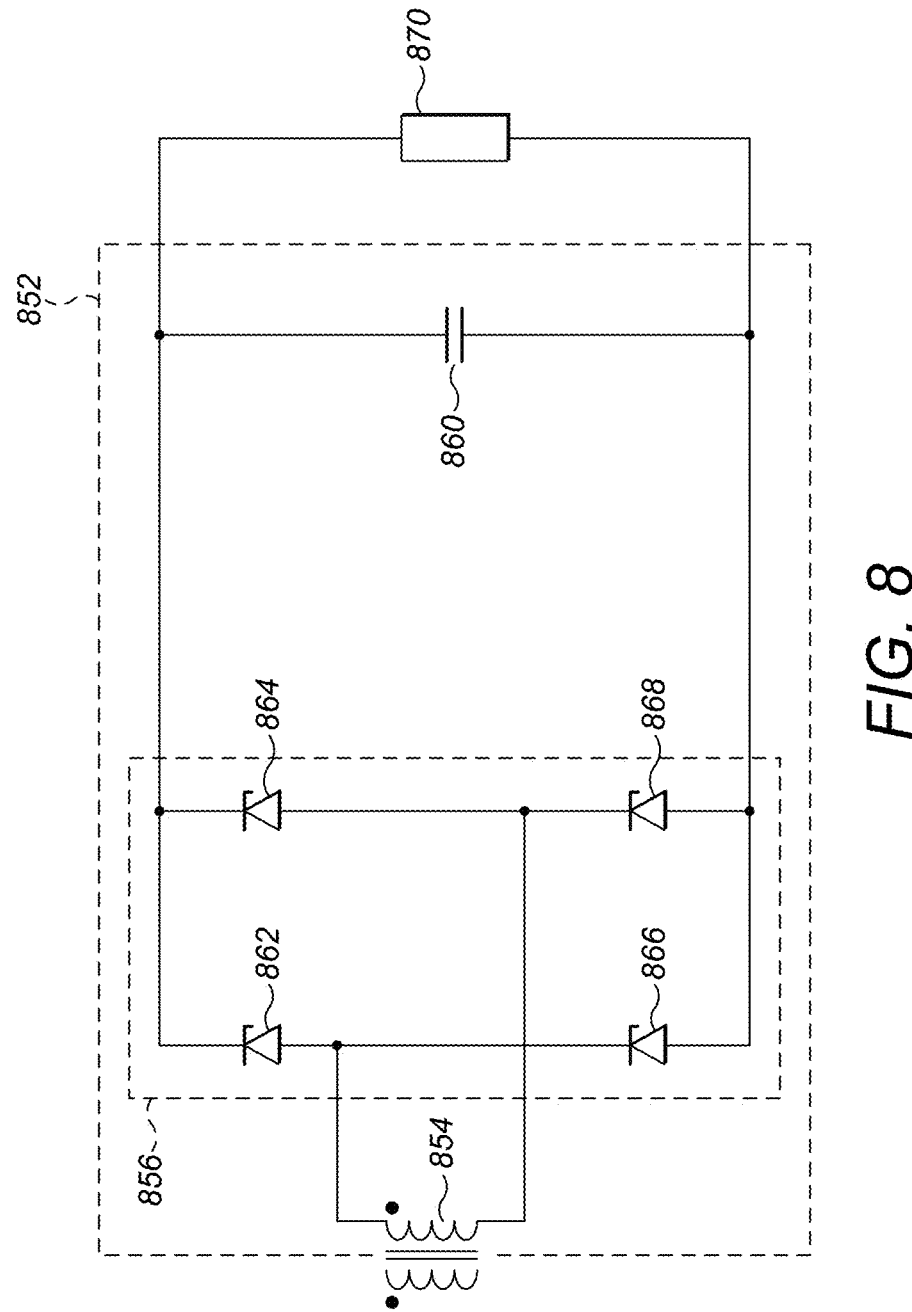
FIG. 8 shows an alternative secondary side used in a seventh preferred embodiment of the present invention.

FIG. 8 shows an alternative secondary side 852 used in a seventh preferred embodiment of the present invention. The seventh preferred embodiment is the same as either the second, third, or fifth preferred embodiments, except that the secondary side 852 of FIG. 8 is used instead of the secondary side shown in FIG. 3, 4, or 6.

In other words, the secondary side 852 of FIG. 8 is applicable to the previous preferred embodiments that include a duty regulating circuit. The secondary side 852 of FIG. 8 is the same as the secondary side 752 of FIG. 7, except that the third inductor 758 has been removed. An inductor on secondary side 852 is not required due to the duty regulating circuit 380 or 580. The secondary side 852 of FIG. 8 functions analogously to the secondary side of the second, third or fifth preferred embodiments in FIG. 3, 4, or 6.

Eighth Preferred Embodiment

Figure 9:
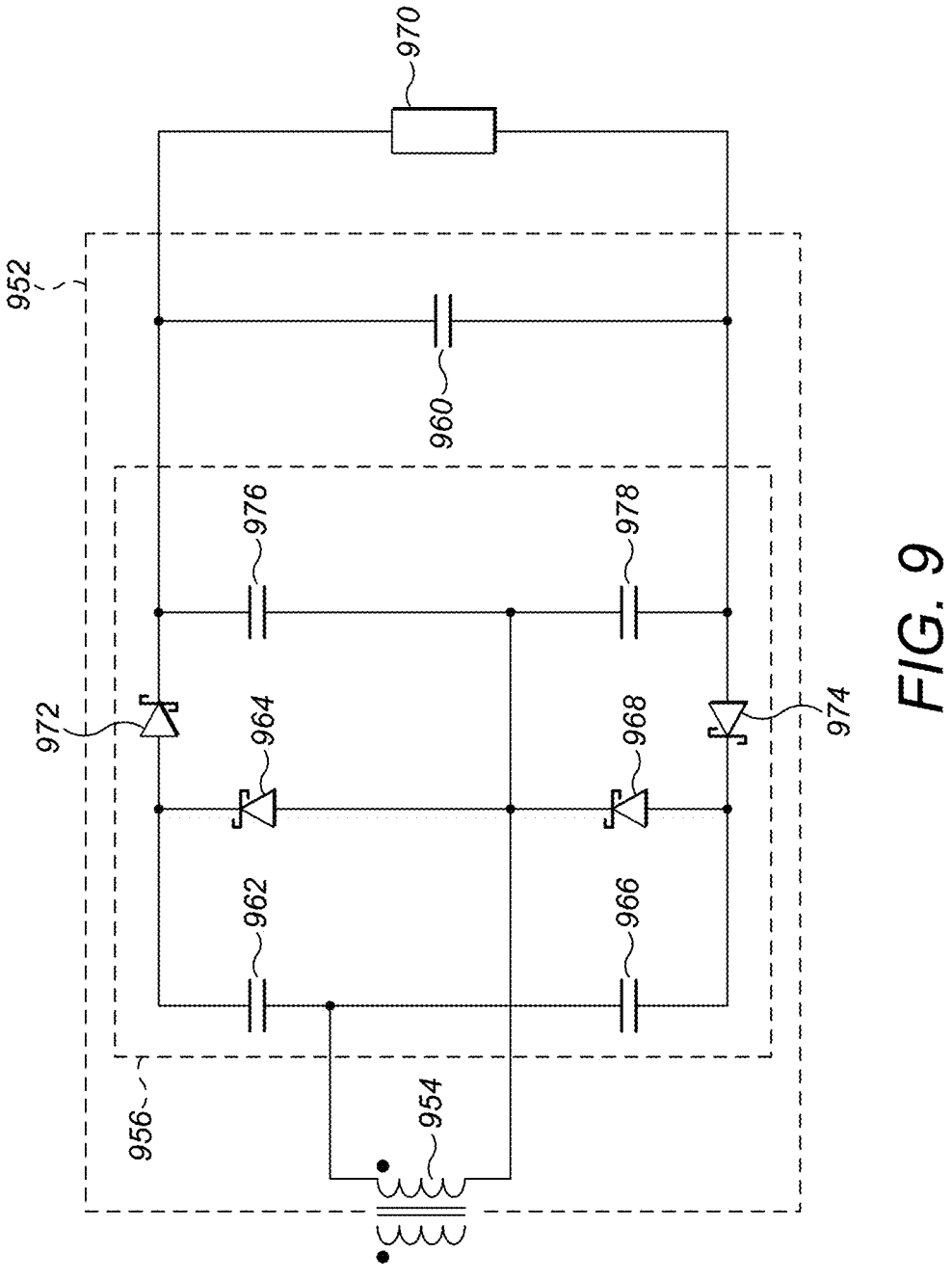
FIG. 9 shows an alternative secondary side used in an eighth preferred embodiment of the present invention.

FIG. 9 shows an alternative secondary side 952 used in an eighth preferred embodiment of the present invention. Similar to the seventh preferred embodiment, the eighth preferred embodiment is the same as the second, third, or fifth preferred embodiments, except that the secondary side 952 of FIG. 9 is used instead of the secondary side shown in FIG. 3, 4, or 6. In other words, the secondary side 952 of FIG. 9 is applicable to the previous preferred embodiments that include a duty regulating circuit. An inductor is therefore not required on the secondary side 952.

The secondary side 952 of FIG. 9 is the same as the secondary side 852 of FIG. 8, except that an alternative rectifier circuit is included. In the preferred embodiment of FIG. 9, a voltage quadrupler circuit is used as the rectifier circuit 956. The quadrupler rectifier circuit 956 includes a fourth capacitor 962, a first diode 964, a fifth capacitor 966, a second diode 968, a third diode 972, a fourth diode 974, a sixth capacitor 976, and a seventh capacitor 978. The fourth capacitor 962 is connected between one end of the second inductor 954 the anode of the third diode 972. The cathode of the third diode 972 is connected to the anode of the fourth diode 974 via the sixth capacitor 976 and the seventh capacitor 978. The cathode of the fourth diode 974 is connected back to the one end of the second inductor 954 via the fifth capacitor 966. The cathode of the fourth diode 974 is also connected to the anode of the second diode 972. The cathode of the second diode 968 is connected to the anode of the first diode 964. The cathode of the first diode 964 is connected to the anode of the third diode 972. The other end of the second inductor 954 is connected to the midpoint between the first and second diodes 964, 968 and is also connected to the midpoint between the sixth and seventh capacitors 976, 978.

The rectifying circuit 956 is connected in the secondary side 952 such that the third capacitor 960 is in parallel with the sixth and seventh capacitors 976, 978. Again, the voltage over the third capacitor 960 is the isolated output voltage $V_{OUT2}$ of the isolated DC-DC converter. In FIG. 9, this output voltage is shown connected over a load resistance 970, which is connected in parallel to the third capacitor 960.

The operation of the secondary side 952 is analogous to the second, third, fifth, and seventh preferred embodiments, except that the output $V_{OUT2}$ over the third capacitor 960 is four times the peak voltage induced in the second inductor 954. This circuit can therefore be used to set the isolated output voltage $V_{OUT2}$ of the DC-DC converter.

Ninth Preferred Embodiment

Figure 10:
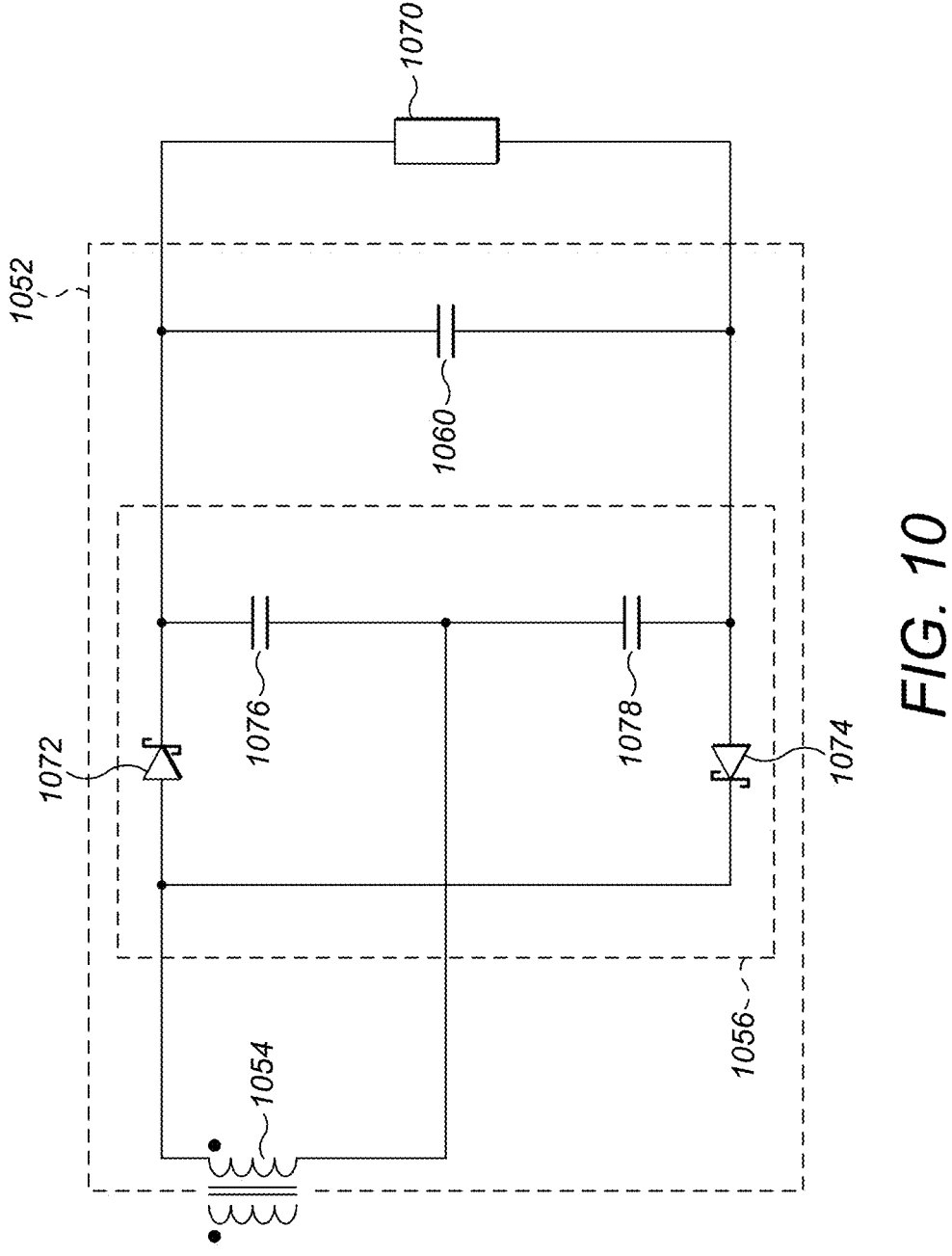
FIG. 10 shows an alternative secondary side used in a ninth preferred embodiment of the present invention.

FIG. 10 shows an alternative secondary side 1052 used in a ninth preferred embodiment of the present invention. The ninth preferred embodiment is the same as the eighth preferred embodiment, except that a voltage doubler circuit is used as the rectifier circuit, instead of a quadrupler circuit.

The voltage doubler rectifier circuit 1056 includes a first diode 1072, a second diode 1074, a fourth capacitor 1076, and a fifth capacitor 1078. The anode of the first diode 1072 is connected to one end of the second inductor 1054. The cathode of the first diode 1072 is connected to the anode of the second diode 1074 via the fourth and fifth capacitors 1076, 1078. The cathode of the second diode 1074 is connected to the one end of second inductor 1054. The other end of the second inductor 1054 is connected to the midpoint of the fourth and fifth capacitors 1076, 1078.

The operation of the secondary side 1052 is analogous to the secondary side 952 of the eighth preferred embodiment, except that the output voltage $V_{OUT2}$ over the third capacitor 1060 is double the peak voltage induced in the second inductor 954.

Tenth Preferred Embodiment

The tenth preferred embodiment, and the following eleventh, twelfth, and thirteenth preferred embodiments, include ICs with additional functions in addition to the functions outlined in Table 1. A list of the possible additional terminals and their functions is given in Table 2 below.

TABLE 2

| Additional pin functions of the ICs. | |
|---|---|
| Name | Description |
| PG/PGOOD | Power good output. PGOOD is an open-drain signal. A pull-up resistor connected to a DC voltage can be used to indicate high if the output voltage is within regulation. |
| SS | Soft-start programming. Place a capacitor from SS to AGND to set the VOUT rising slew rate. |
| TRK/REF | External tracking voltage input. The output voltage tracks this input signal. |
| COMP | Internal error amplifier output. Connect a capacitor and resistor in series from COMP to AGND for loop compensation. |
| VCC/VDD | Internal LDO output. Powers the driver and control circuits. Decouple with 0.1 µF-0.22 µF capacitor (but other capacitance values can be used). |
| SYNC | Apply an external clock to change the switching frequency. |
| BST | Bootstrap. Can use a capacitor connected between SW and BST pins to form a floating supply across the high-side switch driver. |
| MODE | Operation mode selection. Program MODE to select continuous conduction mode (CCM), pulse-skip mode, and the operating switching frequency. |
| VSNS- | Differential remote sense negative input. Connect VSNS- to the negative side of the voltage sense point directly. |
| AGND | Analog ground. Select AGND as the control circuit reference point. |
| PGND | System ground. PGND is the reference ground of the regulated output voltage. |
| CS/ILIM | Current limit. Connect a resistor to ground to set the current limit trip point. |
| VOUT | Output |

Figure 11:
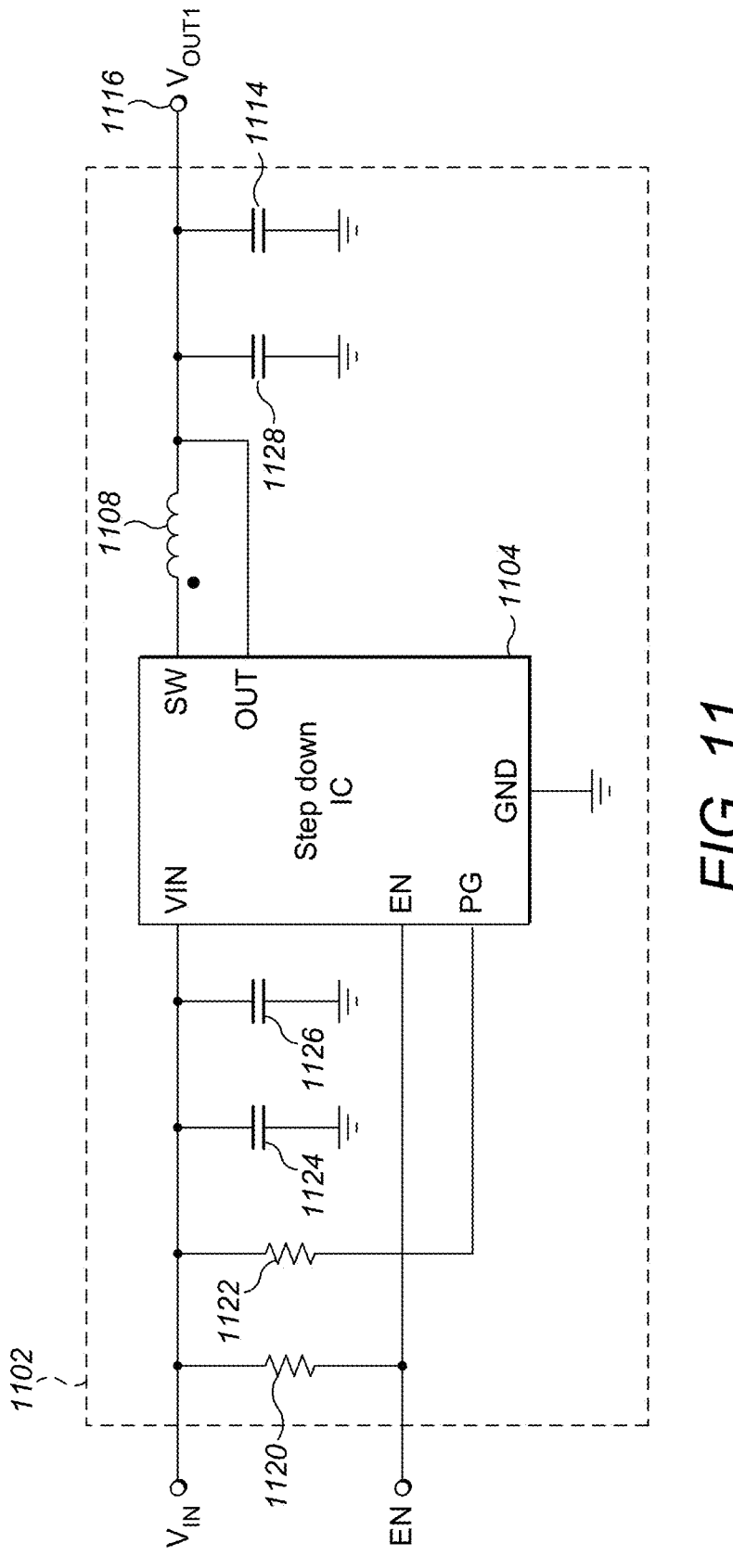
FIG. 11 shows an alternative primary side used in a tenth preferred embodiment of the present invention.

FIG. 11 shows an alternative primary side used in a tenth preferred embodiment of the present invention. The primary side 1102 shown in FIG. 11 can be used in place of the primary side of the first preferred embodiment and can also be used in conjunction with the secondary side of FIG. 7.

The primary side 1102 of FIG. 11 includes a step-down IC 1104. In this preferred embodiment, the step down IC 1104 is a MP2151GTF-25 chip. The step-down IC includes VIN, SW, OUT, EN, PG, and GND terminals. In the preferred embodiment of FIG. 11, an input voltage $V_{IN}$ is input into the VIN terminal of the step-down IC 1104. The VIN terminal is connected to the EN terminal via a first resistor 1120, and the VIN terminal is connected to the PG terminal via a second resistor 1122. The VIN terminal is connected to ground via a first capacitor 1124 and also via a second capacitor 1126. The SW terminal is connected to one end of a first inductor 1108. The other end of the first inductor 1108 is connected to the OUT terminal of the step-down IC 1104 and is connected to an output terminal 1116. The other end of the first inductor 1108 is connected to ground via a third capacitor 1114 and also via a fourth capacitor 1128. The GND terminal is connected to ground.

The primary side 1102 functions as a buck converter in a similar fashion to the primary side 202 of the first preferred embodiment. The inductor of the buck converter, in this case, the first inductor 1108, is coupled to a second inductor in the secondary side as before.

In one particular preferred embodiment, the first resistor 1120 and the second resistor 1122 have a resistance of 100 kΩ (but other resistance values can be used), the second capacitor 1126 and the fourth capacitor 1128 have a capacitance of 10 μF (but other capacitance values can be used), the first capacitor 1124 and the third capacitor 1114 are omitted (not stuffed), and the first inductor 1108 has an inductance of 1 pH (but other inductance values can be used).

The primary side 1102 of the tenth preferred embodiment has the advantage of including less peripheral circuitry around a FB terminal. Moreover, the PG terminal allows determination of the condition of the converter.

Eleventh Preferred Embodiment

Figure 12:
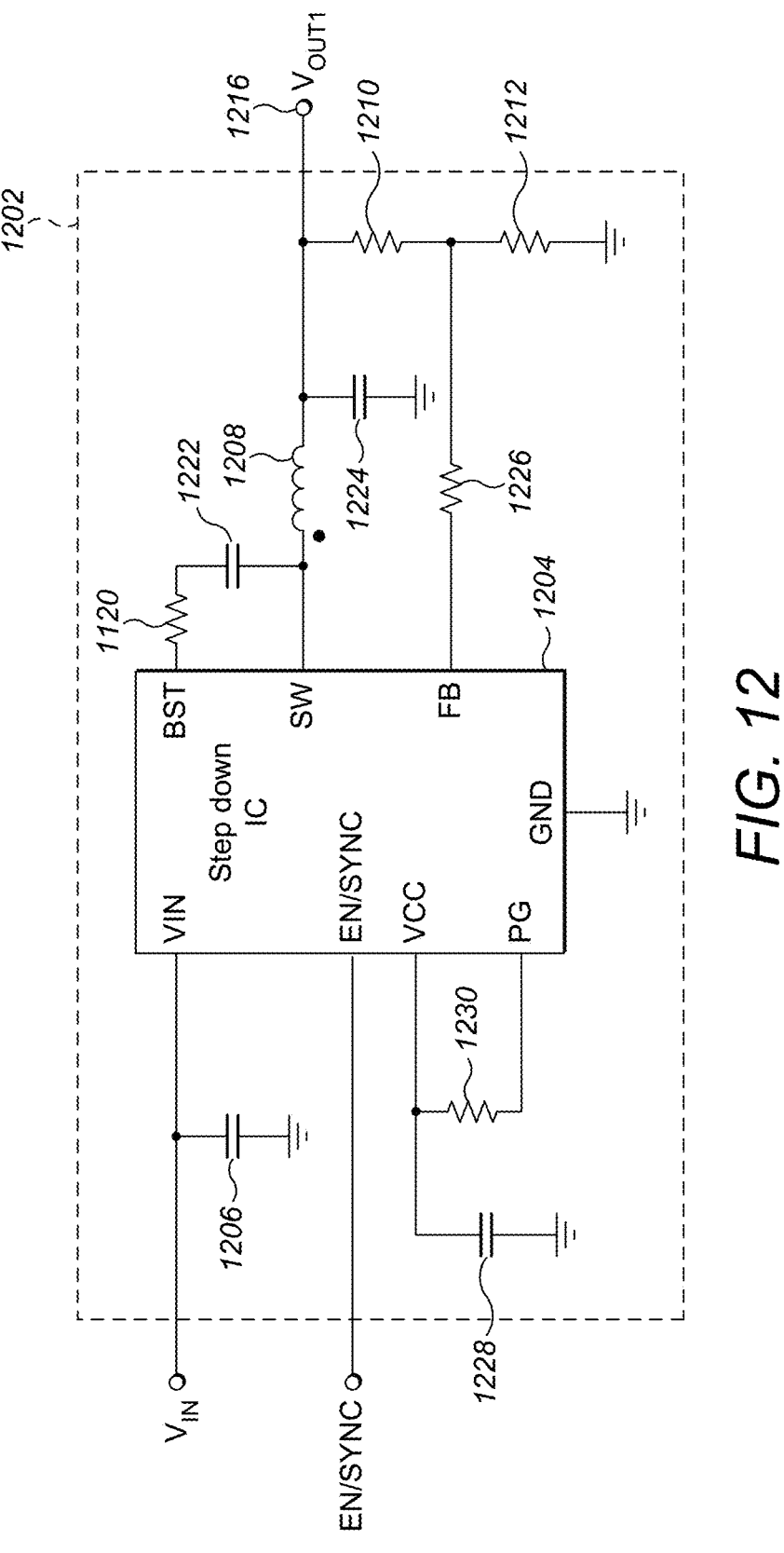
FIG. 12 shows an alternative primary side used in an eleventh preferred embodiment of the present invention.

FIG. 12 shows another alternative primary side used in an eleventh preferred embodiment of the present invention. The primary side 1202 shown in FIG. 12 can be used in place of the primary side in any of the previous preferred embodiments that include a step-down IC.

The primary side 1202 of FIG. 12 includes a step-down IC 1204. In this preferred embodiment, a Monolithic Power Systems® MP1474 synchronous step-down converter is used as the step-down IC 1204. Further details of the operation of the MP1474 IC can be found in the MP1474 datasheet at https://www.monolithicpower.com/en/docu-mentview/productdocument/index/version/2/document-_type/Datasheet/lang/en/sku/MP1474/, which is hereby incorporated by reference. The step-down IC includes VIN, SW, BST, VCC, PG, FB, and GND terminals. In the preferred embodiment of FIG. 12, an input voltage $V_{IN}$ is input into the VIN terminal of the step-down IC 1204. The VIN terminal is connected to ground via a first capacitor 1206. The SW terminal is connected to one end of a first inductor 1208. The BST terminal is also connected to the one end of the first inductor 1208, via a first resistor 1220 and a second capacitor 1222 in series. The other end of the first inductor 1208 is connected to ground via a third capacitor 1224 and is connected to an output terminal 1216. The other end of the first inductor 1208 is connected to ground via a second resistor 1210 and a third resistor 1212 in series. The FB terminal is connected to the midpoint of the second and third resistors 1210, 1212 via a fourth resistor 1226. The VCC terminal is connected to ground via a fourth capacitor 1228. The PG terminal is connected to the VCC terminal via a fifth resistor 1230. The GND terminal is connected to ground.

The primary side 1202 functions as a buck converter in a similar fashion to the primary side 202 of the first preferred embodiment. The inductor of the buck converter, in this case, the first inductor 1208, is coupled to a second inductor in the secondary side as before.

In one particular preferred embodiment, the first capacitor 1206 has a capacitance of 22 μF, the first inductor 1208 has an inductance of 5.5 pH, the first resistor 1220 has a resistance of 20Ω, the second capacitor 1222 has a capacitance of 0.1 μF, the third capacitor 1224 has a capacitance of 47 μF, the second resistor 1210 has a resistance of 40.2 kΩ, the third resistor 1212 has a resistance of 13 kΩ, the fourth resistor 1226 has a resistance of 16 kΩ, the fourth capacitor 1228 has a capacitance of 0.1 μF, and the fifth resistor 1230 has a resistance of 100 kΩ. In this case, the resistance values of the resistors connected to the FB terminal set the output voltage $V_{OUT1}$ at 3.3 V. The input voltage may be between 4.5 V and 16 V. Although specific values and ranges are provided above, other values and ranges can also be used.

The primary side 1202 of the eleventh preferred embodiment can be synchronized with an external clock via the SYNC terminal. The SYNC function is good for electromagnetic interference noise management.

Twelfth Preferred Embodiment

Figure 13:
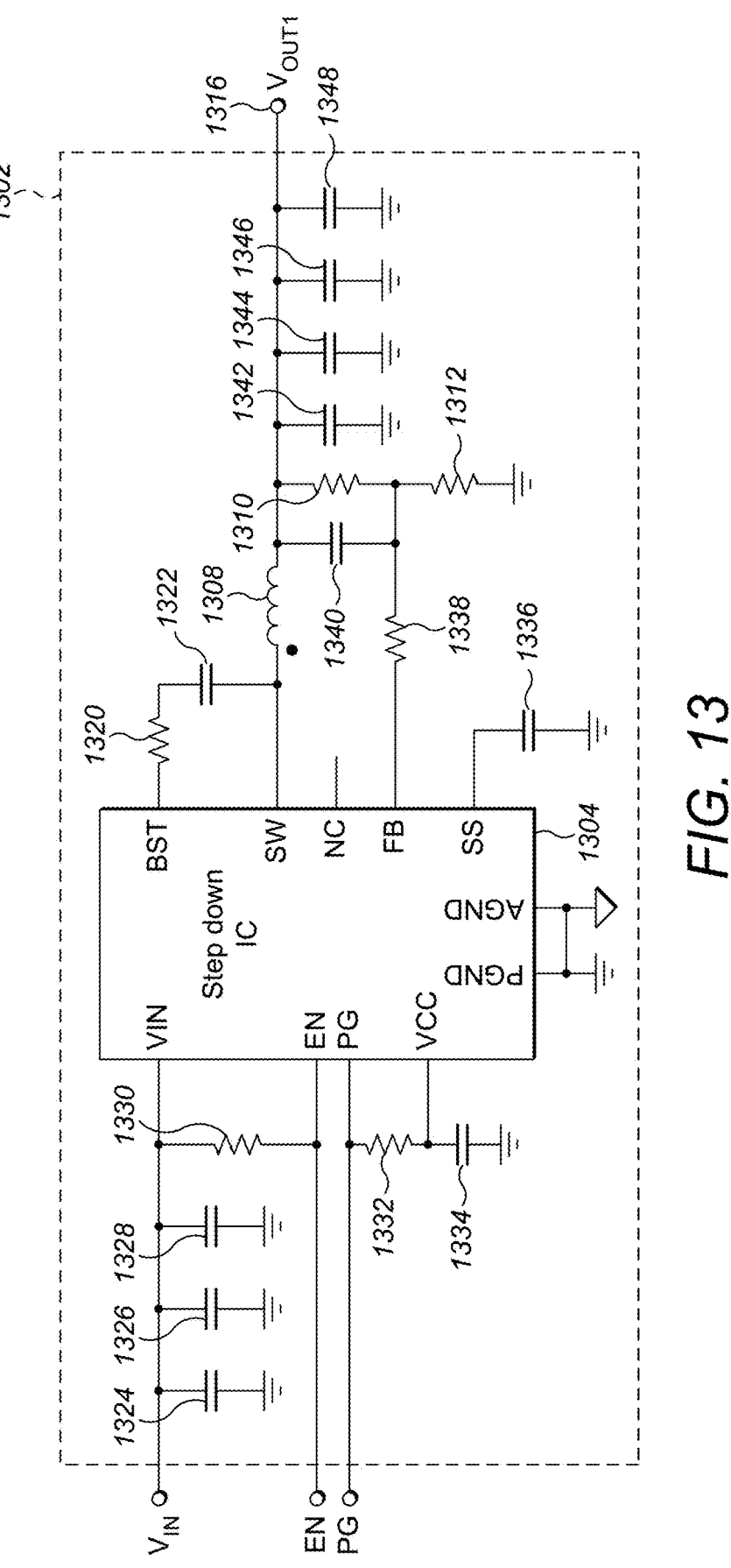
FIG. 13 shows an alternative primary side used in a twelfth preferred embodiment of the present invention.

FIG. 13 shows another alternative primary side used in a twelfth preferred embodiment of the present invention. The primary side 1302 shown in FIG. 13 can be used in place of the primary side in any of the previous preferred embodiments that include a step-down IC.

The primary side 1302 of FIG. 13 includes a step-down IC 1304. In this preferred embodiment a Monolithic Power Systems® MP8774H synchronous step-down converter is used as the step-down IC 1304. Further details of the operation of the MP8774H IC can be found in the MP8774H datasheet at https://www.monolithicpower.com/en/docu-mentview/productdocument/index/version/2/document_type/Datasheet/lang/en/sku/MP8774H/, which is hereby incorporated by reference. The step-down IC includes VIN, SW, BST, EN, PG, VCC, FB, SS, PGND, and AGND terminals, as well as an NC (not connected) terminal. In the preferred embodiment of FIG. 13, an input voltage $V_{IN}$ is input into the VIN terminal of the step-down IC 1304. The VIN terminal is connected to ground via a first capacitor 1324, and via a second capacitor 1326, and via a third capacitor 1328. The VIN terminal is connected to the EN terminal via a first resistor 1330. The SW terminal is connected to one end of a first inductor 1308. The BST terminal is also connected to the one end of the first inductor 1308, via a second resistor 1320 and a fourth capacitor 1322 in series. The other end of the first inductor 1308 is connected to ground via a fifth capacitor 1342, a sixth capacitor 1344, a seventh capacitor 1346, and an eighth capacitor 1348, and is connected to an output terminal 1316. The other end of the first inductor 1308 is connected to ground via a third resistor 1310 and a fourth resistor 1312 in series. The FB terminal is connected to the midpoint of the third and fourth resistors 1310, 1312 via a fifth resistor 1338. A ninth capacitor 1340 is connected between the other end of the first inductor 1308 and the midpoint of the third and fourth resistors 1310, 1312. The VCC terminal is connected to ground via a tenth capacitor 1334. The PG terminal is connected to the VCC terminal via a sixth resistor 1332. The SS terminal is connected to ground via eleventh capacitor 1336. The PGND and AGND terminals are connected to ground.

The primary side 1302 functions as a buck converter in a similar fashion to the primary side 202 of the first preferred embodiment. The inductor of the buck converter, in this case, the first inductor 1308, is coupled to a second inductor in the secondary side as before.

In one particular preferred embodiment the first capacitor 1324 has a capacitance of 22 μF, the second capacitor 1326 has a capacitance of 22 μF, the third capacitor 1328 has a capacitance of 0.1 μF, the first resistor 1330 has a resistance of 100 kΩ, the first inductor 1308 has an inductance of 0.68 pH, the second resistor 1320 has a resistance of 0Ω, the fourth capacitor 1322 has a capacitance of 0.1 μF, the fifth capacitor 1342 has a capacitance of 22 μF, the sixth capacitor 1344 has a capacitance of 22 μF, the seventh capacitor 1346 has a capacitance of 22 μF, the eighth capacitor 1348 has a capacitance of 22 μF, the third resistor 1310 has a resistance of 20 kΩ, the fourth resistor 1312 has a resistance of 2.7 kΩ, the fifth resistor 1338 has a resistance of 1 kΩ, the ninth capacitor 1340 has a capacitance of 56 μF, the tenth capacitor 1334 has a capacitance of 1 μF, the sixth resistor 1332 has a resistance of 100 kΩ, and the eleventh capacitor 1336 has a capacitance of 22 nF. In this case, the resistance values of the resistors connected to the FB terminal set the output voltage $V_{OUT1}$ at 5 V for a 12 V input. Although specific values and ranges are provided above, other values and ranges can also be used.

In the primary side 1302 of the twelfth preferred embodiment, the SS pin can control start up ramp up speed. Slowing down the start up can be used to suppress the inrush current, which could otherwise lead to failure of the device if the inrush current is large.

Thirteenth Preferred Embodiment

Figure 14:
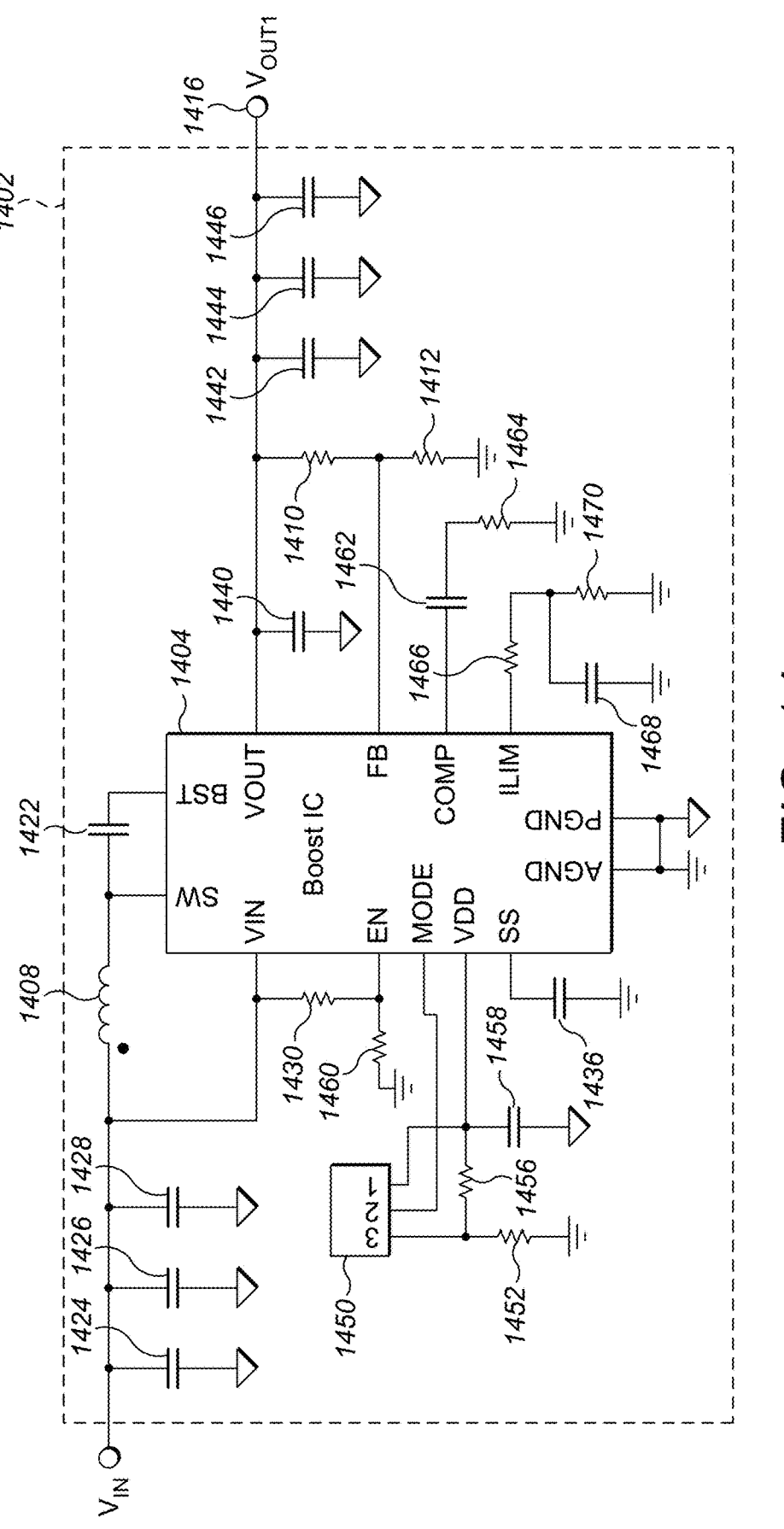
FIG. 14 shows an alternative primary side used in a thirteenth preferred embodiment of the present invention.

FIG. 14 shows another alternative primary side used in a thirteenth preferred embodiment of the present invention. The primary side 1402 shown in FIG. 14 can be used in place of the primary side in any of the previous preferred embodiments that includes a step-up/boost IC.

The primary side 1402 of FIG. 14 includes a boost IC 1404. In this preferred embodiment a Monolithic Power Systems® MP3431 synchronous boost converter is used as the boost IC 1404. Further details of the operation of the MP3431 IC can be found in the MP3431 datasheet at https://www.monolithicpower.com/en/documentview/pro-ductdocument/index/version/2/document_type/Datasheet/lang/en/sku/MP3431/, which is hereby incorporated by reference. The boost IC includes VIN, SW, BST, VOUT, FB, COMP, ILIM, EN, MODE, VDD, SS, AGND, and PGND terminals. In the preferred embodiment of FIG. 14, an input voltage $V_{IN}$ is input into a first end of a first inductor 1408. The first end of the first inductor 1408 is also connected to ground via a first capacitor 1424, and via a second capacitor 1426, and via a third capacitor 1428. The other end of the first inductor 1408 is connected to the SW terminal and connected to the BST terminal via a fourth capacitor 1422. The first end of the first inductor 1408 is connected the VIN terminal. The VIN terminal is connected the EN terminal via a first resistor 1430. The EN terminal is connected to ground via a second resistor 1460. The VOUT terminal of the boost IC 1404 is connected to the output terminal 1416 and is connected to ground via a fifth capacitor 1440, via a sixth capacitor 1442, via a seventh capacitor 1444 and via an eighth capacitor 1446. The VOUT terminal is also connected to ground via a third resistor 1410 and a fourth resistor 1412 in series. The FB terminal is connected to the midpoint between the third and fourth resistors 1410, 1412. The COMP terminal is connected to ground via a ninth capacitor 1462 and a ninth resistor 1464. The ILIM terminal is connected to ground via a fifth resistor 1466 and a sixth resistor 1470 in series. The midpoint of the fifth and sixth resistors 1466, 1470 is connected to ground via a tenth capacitor 1468. The VDD terminal is connected to ground via a seventh resistor 1456 and an eighth resistor 1452 in series. The VDD terminal is also connected to ground via an eleventh capacitor 1458. The MODE terminal is connected to both the VDD terminal and the midpoint of the seventh and eighth resistors 1456, 1452 via a junction 1450. The SS terminal is connected to ground via a twelfth capacitor 1436. The AGND and PGND terminals are connected to ground.

The primary side 1402 functions as a boost converter in a similar fashion to the primary side 502 of the fourth preferred embodiment. The inductor of the boost converter, in this case, the first inductor 1408, is coupled to a second inductor in the secondary side as before.

In one particular preferred embodiment the first inductor 1408 has an inductance of 1.5 pH, the first capacitor 1424 has a capacitance of 22 μF, the second capacitor 1426 has a capacitance of 22 μF, the third capacitor 1428 has a capacitance of 22 μF, the fourth capacitor 1422 has a capacitance of 0.1 μF, the first resistor 1430 has a resistance of 30 kΩ, the second resistor 1460 is omitted (not stuffed), the fifth capacitor 1440 has a capacitance of 0.1 μF, the sixth capacitor 1442 has a capacitance of 22 μF, the seventh capacitor 1444 has a capacitance of 22 μF, the eighth capacitor 1446 has a capacitance of 22 μF, the third resistor 1410 has a resistance of 750 kΩ, the fourth resistor 1412 has a resistance of 53.6 kΩ, the ninth capacitor 1462 has a capacitance of 6.8 μF, the fifth resistor 1466 has a resistance of 1 kΩ, the sixth resistor 1470 has a resistance of 21.5 kΩ, the tenth capacitor 1468 has a capacitance of 4.7 nF, the seventh resistor 1456 has a resistance of 130 kΩ, the eighth resistor 1452 has a resistance of 20 kΩ, the eleventh capacitor 1458 has a capacitance of 4.7 μF, and the twelfth capacitor 1436 has a capacitance of 22 nF. In this case the resistance values of the resistors connected to the FB terminal set the output voltage $V_{OUT1}$ at 15 V. The input voltage may be between 6V and 8.4V. Although specific values and ranges are provided above, other values and ranges can also be used.

In the primary side 1402 of the thirteenth preferred embodiment the ILIM function can control the current limit threshold.

Fourteenth Preferred Embodiment

Figure 15:
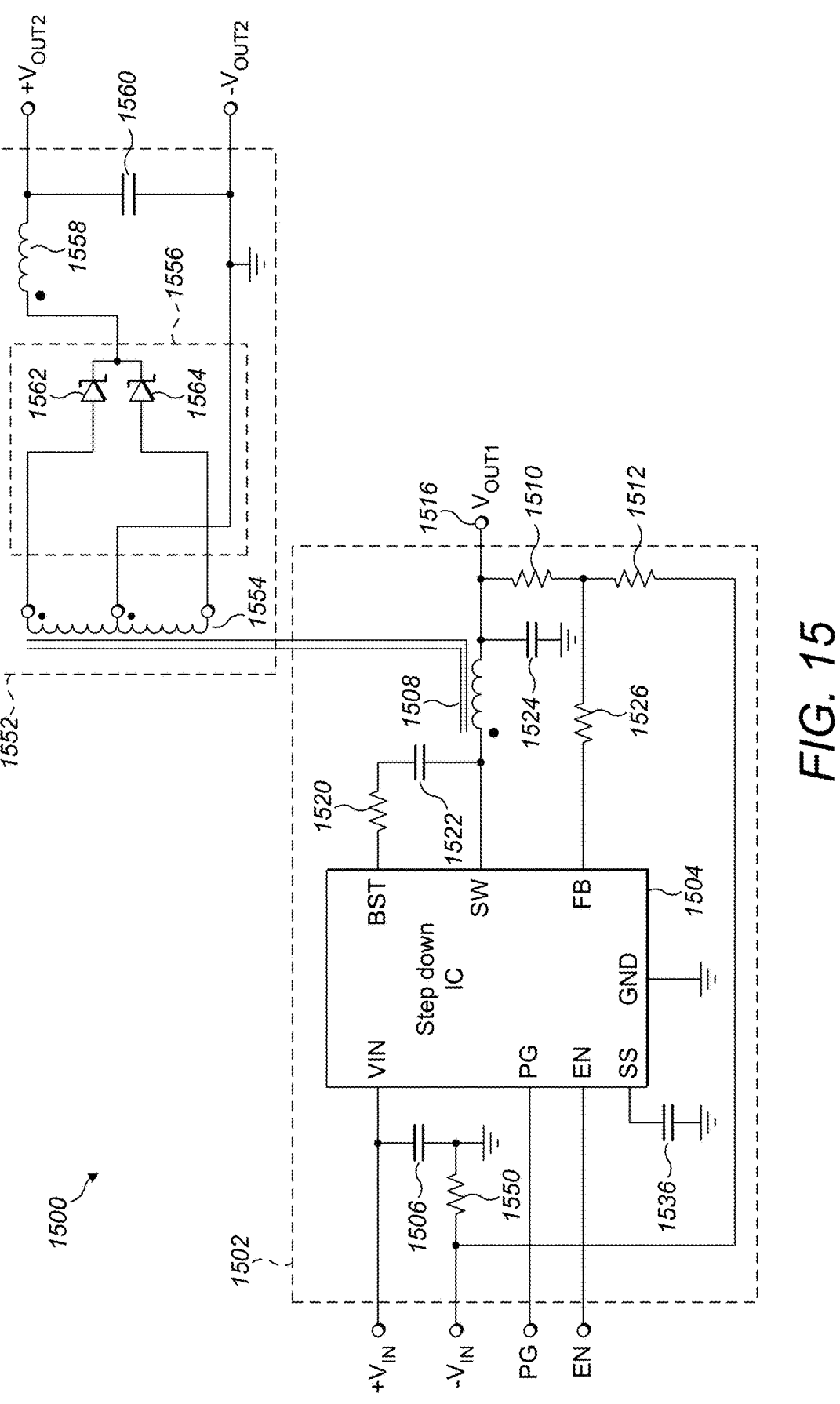
FIG. 15 shows an isolated DC-DC converter of a fourteenth preferred embodiment of the present invention.

FIG. 15 shows an isolated DC-DC converter of a fourteenth preferred embodiment of the present invention, that improves the load regulation of the output voltage.

The isolated DC-DC converter 1500 of FIG. 15 includes a primary side 1502 and a secondary side 1552. The secondary side 1552 is the same as in the first and fourth preferred embodiments and is coupled to the primary side in the same fashion. A repeat of the description of the secondary side will therefore be omitted. The primary side 1502 includes a step-down IC 1504. In this preferred embodiment, a Monolithic Power Systems® MP2332C synchronous step-down converter is used as the step-down IC 1504. Further details of the operation of the MP2332C IC can be found in the MP2332C datasheet at https://www.monolithicpower-.com/en/documentview/productdocument/index/version/2/document_type/Datasheet/lang/en/sku/MP2332C/documen-t_id/4403/, which is hereby incorporated by reference. The step-down IC 1504 includes VIN, SW, BST, PG, EN, SS, FB, and GND terminals. In the preferred embodiment of FIG. 15, the VIN terminal of the step-down IC 1504 is connected to ground via a first capacitor 1506. The SW terminal is connected to one end of a first inductor 1508. The BST terminal is also connected to the one end of the first inductor 1508, via a first resistor 1520 and a second capacitor 1522 in series. The other end of the first inductor 1508 is connected to ground via a third capacitor 1524 and is connected to an output terminal 1516. The SS terminal is connected to ground via a fourth capacitor 1536. The GND terminal is connected to ground.

In the fourteenth preferred embodiment, the other end of the first inductor 1508 is again connected to a second resistor 1510 and a third resistor 1512 in series. The FB terminal is connected to the midpoint of the second and third resistors 1510, 1512 via a fourth resistor 1526. However, unlike in the previous preferred embodiments, the third resistor 1512 is connected to ground via an additional resistor, the fifth resistor 1550. The input voltage $V_{IN}$ is input between the VIN terminal and the midpoint between the third and fifth resistors 1512, 1550. The arrangement of the fifth resistor 1550 and the voltage input forms a duty compensation circuit, as will be described below.

The purpose of the fifth resistor 1550 is to improve the load regulation. When operating at higher frequencies the output voltage of the secondary side is reduced due to power transfer delay caused by the leakage inductance of the transformer and the poor coupling factor between the coils. This effect is greater for larger loads. The secondary side is always monitoring the primary side via the second inductor 1554, and therefore, the reduction in the output voltage due to the leakage inductance cannot be avoided. A circuit to compensate or directly monitor the secondary side could be used to improve the load regulation. However, this would result in a complex circuit, and care should be used to ensure proper isolation of the secondary side. Instead, the present preferred embodiment offers a simpler solution via the fifth resistor 1550 of the duty compensation circuit.

The duty compensation circuit is configured to increase the duty cycle of the high-side switch Q1 in the step-down IC 1504 to increase the output voltage to compensate for the power transfer delay. When the output current is connected to a load, a voltage drop is present over the fifth resistor 1550. This voltage drop is sensed by the FB terminal of the IC 1504, as the FB terminal is connected to an internal op amp which maintains a fixed reference voltage at the terminal. When a heavy load is connected to the output, the current through the third resistor 1512 becomes small, and the voltage over the third capacitor 1524 increases. Therefore, the change in the voltage drop over the fifth resistor 1550 causes a change in $V_{OUT1}$, which is also seen in the output of the secondary side 1552. In other words, the on duty of the IC 1504 is increased by changing the load current. A heavy load increases the on duty, which compensates for the decrease in output voltage due to leakage inductance. Therefore, voltage regulation is improved by this on duty compensation circuit.

The concept of the fourteenth preferred embodiment can be applied to any of the previous preferred embodiments that do not include the duty regulating circuit. In particular, the additional resistor could be introduced analogously to the primary sides of the preferred embodiments shown in FIGS. 2, 5, 12, 13, and 14.

In one particular preferred embodiment, the first capacitor 1506 has a capacitance of 22 μF, the first resistor 1520 has a resistance of 20Ω, the second capacitor 1522 has a capacitance of 1 μF, the third capacitor 1524 has a capacitance of 44 μF, the fourth capacitor 1536 has a capacitance of 6.8 nF, the second resistor 1510 has a resistance of 40.2 kΩ, the third resistor 1512 has a resistance of 13 kΩ, the fourth resistor 1526 has a resistance of 20 kΩ, the first inductor 1508 has an inductance of 4.7 pH, and the fifth resistor 1550 has a resistance of 0.47Ω. In this case, the resistance values of the resistors connected to the FB terminal set the output voltage $V_{OUT1}$ at 3.3 V for a 12 V input. Although specific values are provided above, other values can also be used.

Alternatively, instead of the additional resistor, the voltage drop over the internal low side or high side switch (FET) in the IC could be used to provide the same effect but might require a masking circuit to detect the ON timing of the switch only.

Fifteenth Preferred Embodiment

Figure 16:
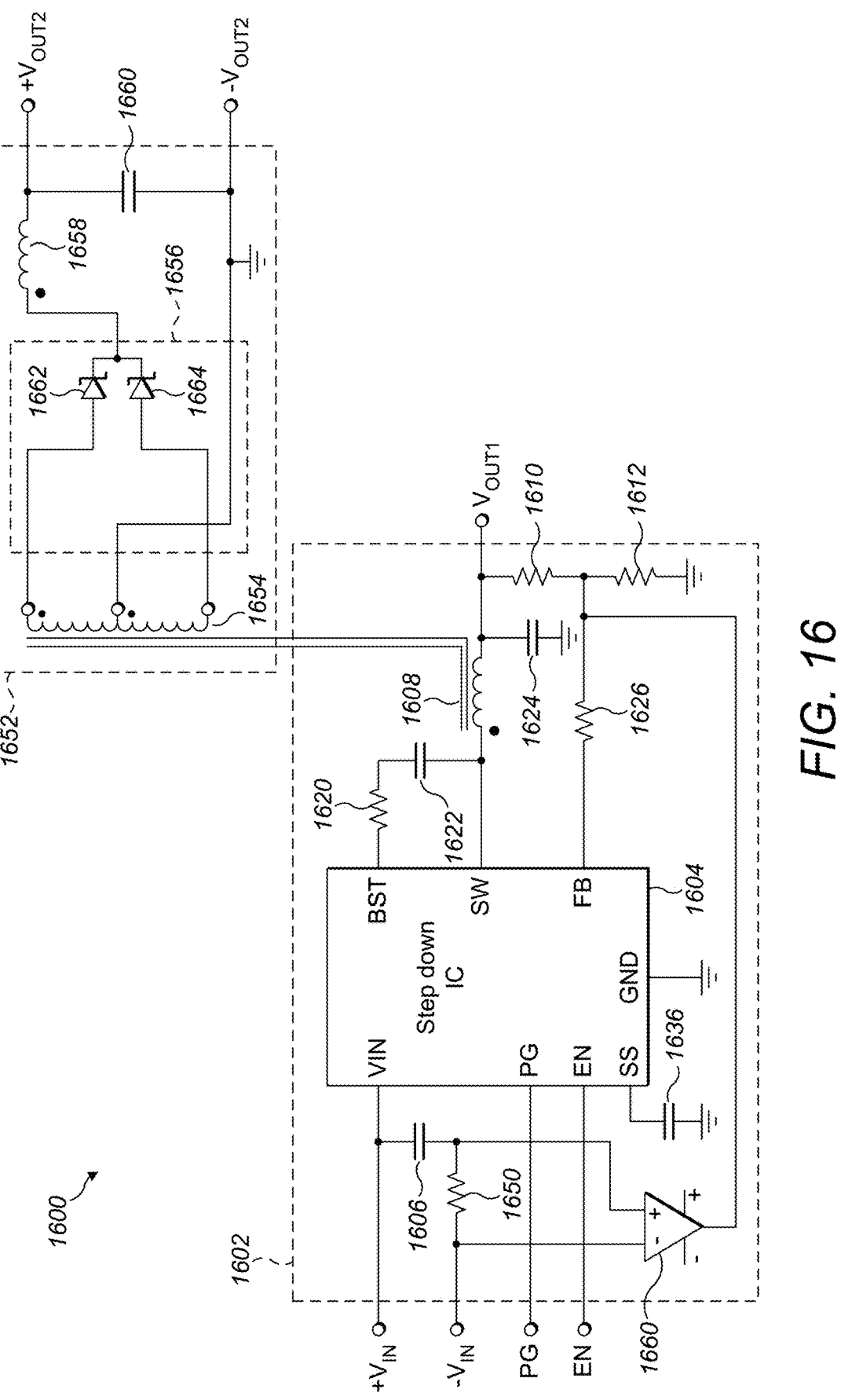
FIG. 16 shows an isolated DC-DC converter of a fifteenth preferred embodiment of the present invention.

FIG. 16 shows an isolated DC-DC converter of a fifteenth preferred embodiment of the present invention. The isolated DC-DC converter 1600 of the fifteenth preferred embodiment is the same as in the fourteenth preferred embodiment, except that the duty compensation circuit has a different configuration. In the fifteenth preferred embodiment, the first inductor 1608 is connected to ground via the second resistor 1610 and the third resistor 1612 in series. The VIN terminal of the step-down IC 1604 is connected to the first capacitor 1606, which is connected to the fifth resistor 1650. The fifth resistor is connected to an amplifying circuit. For example, in FIG. 16 the fifth resistor 1650 is connected between the inverting and non-inverting inputs of an op amp 1660, with the non-inverting input of the op amp connected to the midpoint of the first capacitor 1606 and the fifth resistor 1650. The output of the op amp 1660 is connected to the midpoint of the second resistor 1610 and the third resistor 1612. The input voltage $V_{IN}$ is input between the VIN terminal and the inverting input of the op amp 1660.

The isolated DC-DC converter 1600 of the fifteenth preferred embodiment functions in the same way as the fourteenth preferred embodiment. Namely the duty compensation circuit increases the on duty of the IC 1604 in order to compensate for the reduction in the output voltage and improve the load regulation. However, in the fifteenth preferred embodiment the amplifying circuit, in this case the op amp 1660, amplifies the voltage drop over the fifth resistor 1650, and the amplified signal output by the amplifying circuit is input into the FB terminal. Therefore, the resistance of the fifth resistor 1650 can be smaller than in the fourteenth preferred embodiment, meaning the circuit efficiency is improved as the voltage drop over the fifth resistor is smaller.

Again, the concept of the fifteenth preferred embodiment can be applied to any of the previous preferred embodiments that do not include the duty regulating circuit.

Sixteenth Preferred Embodiment

A sixteenth preferred embodiment of the invention will now be discussed in relation to FIGS. 17 to 19.

The sixteenth preferred embodiment of the present invention can be applied to gate driver circuits. FIG. 17 shows an exemplary gate driver circuit 1700 of the prior art. The gate driver circuit outputs a signal to the gate terminal of a device 1702. The device 1702 is a power switch, such as an insulated-gate bipolar transistor (IGBT), a silicon carbide MOSFET (SIC), a standard silicon MOSFET (MOS), a Gallium Nitride (GaN) transistor, or the like. Technical fields with power switch gate drive applications, such as motor drives, inverters, uninterruptible power sources (UPS), solar power, electric vehicles, and so on, might require accurate input voltages at the gate of the power switch, provided by a gate driver circuit.

Figure 17:
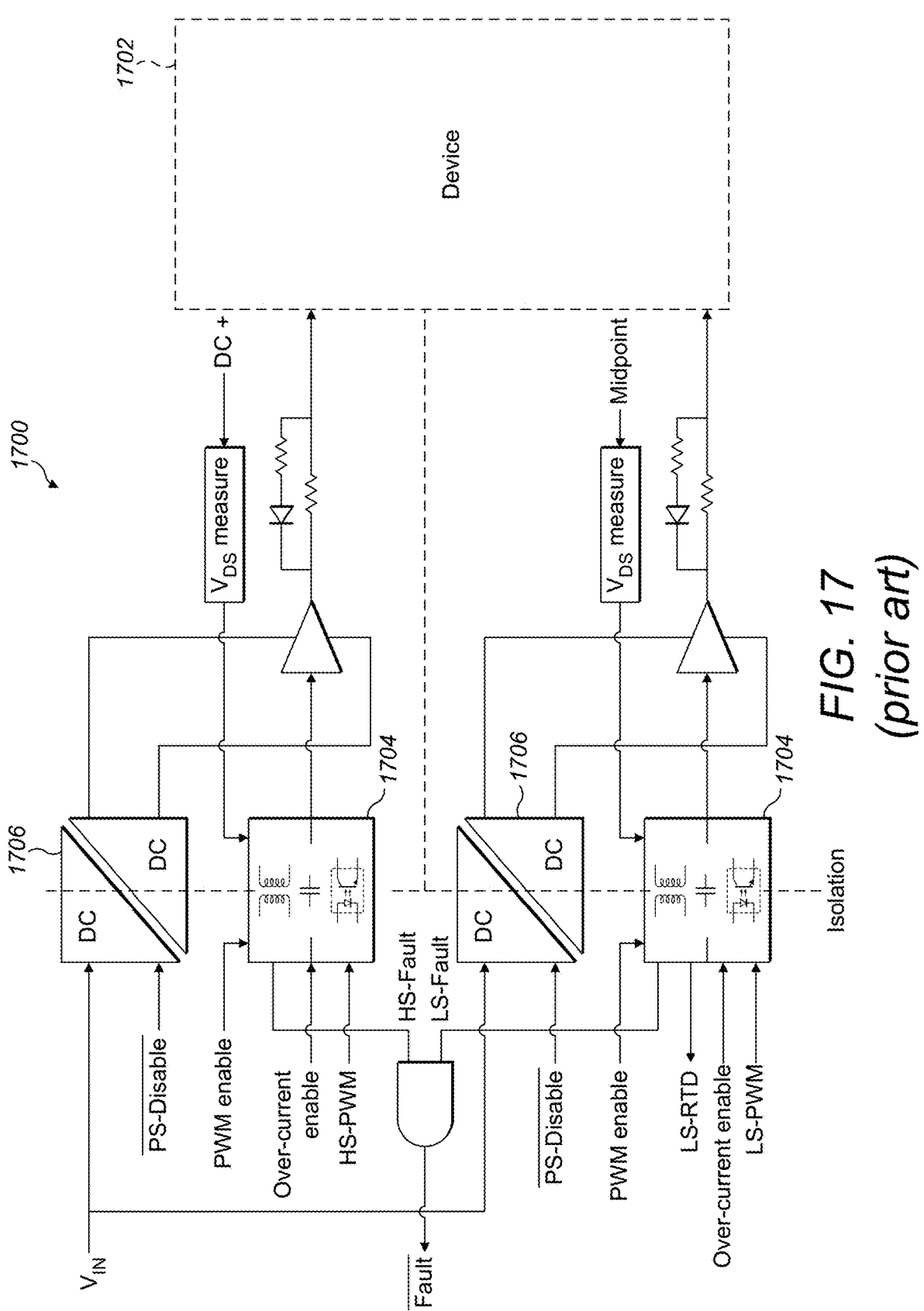
FIG. 17 shows a gate driver circuit of the prior art.

In FIG. 17, PS stands for power supply, HS stands for high side, LS stands for low side, PWM stands for pulse-width modulation, and RTD stands for Resistance Temperature Detector. In order to preserve insulation between the signal and power in the exemplary gate driver circuit 1700, an isolated gate driver 1704 is used to send the gate signal, and an isolated DC-DC converter 1706 is used for transmitting electrical power. Because of the two separate isolated components (the isolated gate driver 1704 and the isolated DC-DC converter 1706), known gate driver circuits such as the gate driver circuit 1700 of FIG. 17 have a tendency to be large.

Figure 18:
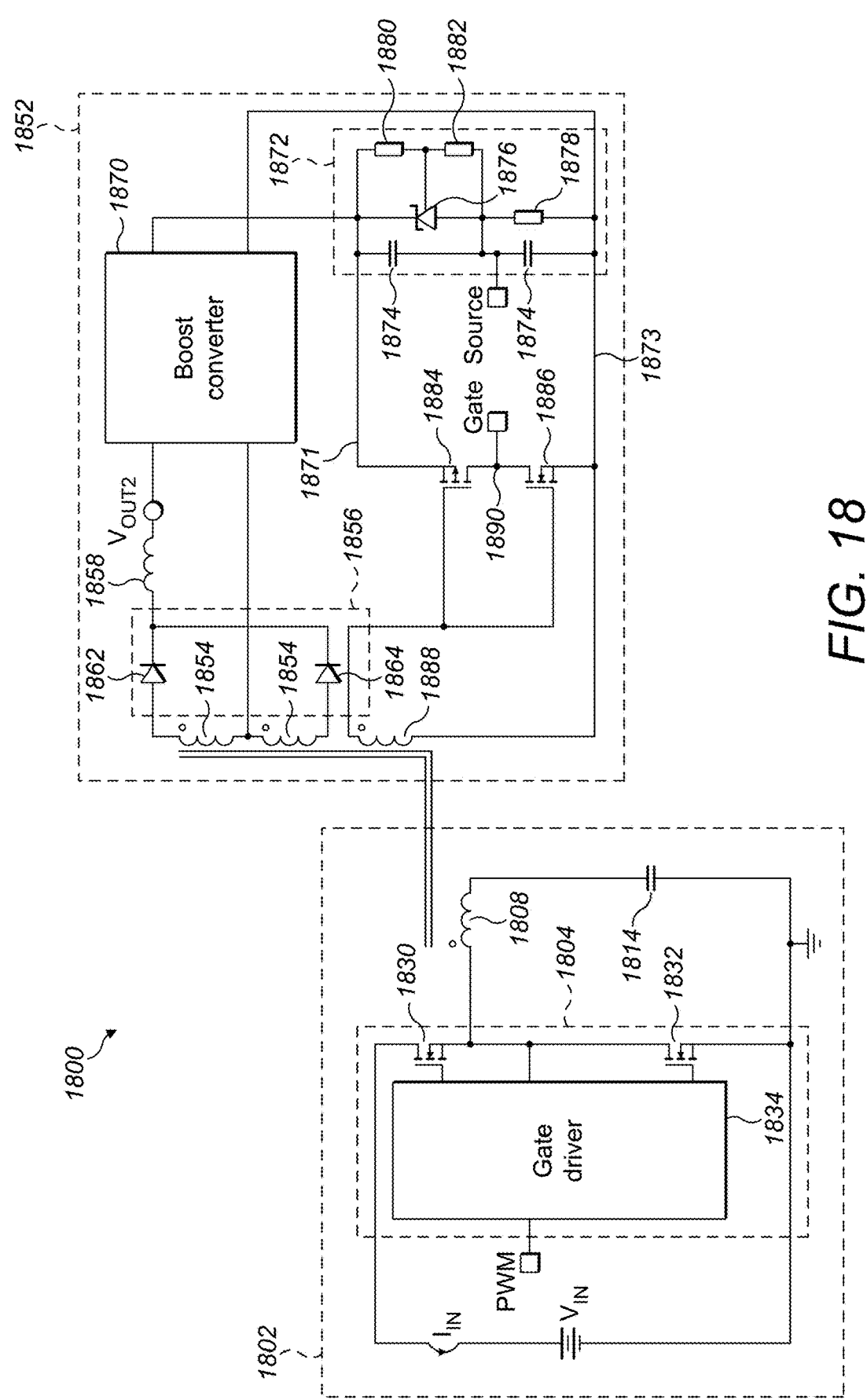
FIG. 18 shows an integrated gate signal and power circuit of a sixteenth preferred embodiment using an isolated DC-DC converter.

FIG. 18 shows a sixteenth preferred embodiment of the present invention utilized in a gate drive application. FIG. 18 shows an integrated gate signal and power circuit 1800 using an isolated DC-DC converter described above.

The integrated gate signal and power circuit 1800 includes a non-isolated buck converter as a primary side 1802, and a secondary side 1852 that is isolated from and controlled by the primary side 1802. In the sixteenth preferred embodiment, the buck converter primary side includes an IC 1804, which can be formed as a single chip. However, unlike in the previous preferred embodiments, there is no control loop, and instead, the IC 1804 includes only first and second switches 1830, 1832 and a gate driver 1834 acting as a switch controller. The gate driver 1834 receives a controlled pulse waveform (PWM) and outputs a driving signal to the first and second switches 1830, 1832. An input voltage $V_{IN}$ is input into the IC 1804 across the first and second switches 1830, 1832. The output of the IC 1804 is connected to a first inductor 1808, which is connected to ground by a first capacitor 1814. The non-isolated output voltage $V_{OUT1}$ of the primary side 1802 could be taken from a point between the first inductor 1808 and the first capacitor 1814; however, $V_{OUT1}$ is varied by the PWM signal as there is no control loop. And so in this preferred embodiment $V_{OUT1}$ is unlikely to be used by other circuits.

Similar to the previous preferred embodiments, the inductor of the buck converter (the first inductor 1808) is coupled to a second inductor 1854 in the secondary side 1852, such that the first inductor 1808 and the second inductor 1854 define a transformer. In the sixteenth preferred embodiment, the first inductor 1808 is also coupled to a third inductor 1888, which is discussed in more detail later. A gapless magnetic core may be used to couple the first inductor 1808 to the second inductor 1854 and/or third inductor 1888. The secondary side 1852 is electrically isolated from the primary side 1802 by the transformer.

The secondary side 1852 also includes a full wave rectifier circuit 1856 and a fourth inductor 1858. In this preferred embodiment, the rectifier circuit 1856 is a two diode center-tapped full wave rectifier that includes a first diode 1862, a second diode 1864, and a center-tap halfway along the second inductor 1854. The anode of the first diode 1862 and the anode of the second diode 1864 are connected to opposite ends of the second inductor 1854. The cathode of the first diode 1862 and the cathode of the second diode 1864 are connected to one end of the fourth inductor 1858. The alternative rectifier circuits of the sixth, eighth, and ninth preferred embodiments could also be used in the sixteenth preferred embodiment. In this preferred embodiment, the fourth inductor 1858 alone acts as the filter circuit.

The voltage output by the fourth inductor 1858 is the isolated output voltage $V_{OUT2}$ of the isolated DC-DC converter.

In the sixteenth preferred embodiment, the output voltage $V_{OUT2}$ is input into a boost converter 1870 and the center-tap halfway along the second inductor 1854 is also input into the boost converter. The boost converter 1870 can be an IC, formed as a single chip. The boost converter may include a power stage. In other words, the boost converter control IC can include an internal power switch, which can handle above about 0.5 A. This means an external semiconductor switch is not needed. The power stage means that the combination of power switches in the boost converter IC define half bridge or full bridge. The output voltages of the boost converter 1870 are input into upper and lower power rails 1871, 1873 of an output unit or voltage generator 1872. The output unit 1872 includes a capacitor bridge and a shunt regulator to generate positive and negative power supply voltages from the boost converter output.

In more detail, the output unit 1872 includes a voltage dividing element 1874 connected in series between the upper and lower power rails 1871, 1873. A pair of capacitors 1874 act as the voltage dividing element 1874 in the present preferred embodiment. The output unit 1872 further includes a shunt regulator 1876 and a first resistor 1878 connected in series between the upper and lower power rails 1871, 1873. In some preferred embodiments, an additional resistor (not shown) may also optionally be included in series to a low voltage side of the shunt regulator 1876, to act as a short circuit protection component. In the present preferred embodiment, the shunt regulator 1876 is controlled by a potential divider formed from a second resistor 1880 and a third resistor 1882. The second and third resistors 1880, 1882 are connected in series between the upper power rail 1871 and the midpoint between the shunt regulator 1876 and the first resistor 1878. The midpoint between the shunt regulator 1876 and the first resistor 1878 is connected to the midpoint of the voltage dividing element 1874 (the pair of capacitors 1874). The shunt regulator 1876 is controlled by the midpoint voltage of the potential divider defined by the second and third resistors 1880, 1882.

In use, the output unit 1872 receives the output voltages of the boost converter 1870 and generates positive and negative power supply voltages from the boost converter output. These positive and negative power supply voltages are defined with respect to the midpoint between the voltage dividing element 1874 (which may be connected to ground or 0 V in some preferred embodiments). The voltage dividing element 1874 converts the received output voltage from the boost converter 1870 into the positive and negative power supply voltages, and the shunt regulator 1876 sets the voltage between one of the power rails, in this case the upper rail 1871, and the midpoint of the voltage dividing element 1874. The voltage between the other power rail, kin this case the lower rail 1872, and the midpoint of the voltage dividing element 1874 is equal to the voltage difference produced between the boost converter 1870 output terminals, less the voltage set by the shunt regulator.

Although the shunt regulator 1876 is shown in FIG. 18 between the upper rail 1871 and the midpoint of the voltage dividing element 1874, the shunt regulator 1876 could also be located between the midpoint of the voltage dividing element 1874 and the lower rail 1873 in some preferred embodiments. The shunt regulator 1876 therefore sets one of the positive and negative supply voltages at predetermined voltage value. In one particular preferred embodiment, ZR431L adjustable precision shunt regulator may be used as the shunt regulator 1876. In another preferred embodiment, a Zener diode may be used as the shunt regulator, without the potential divider formed by the second and third resistors 1880, 1882. One example of a possible output unit or voltage generator is described in UK patent application number GB2020177.8, the entire contents of which are hereby incorporated by reference. Other possible output units or voltage generators are described in UK patent publications GB2586049 and GB2586050, which are hereby incorporated by reference.

The positive and negative power supply voltages generated by the output unit 1872 are input into a switching circuit including a first switching element 1884 and a second switching element 1886, in this case a P-channel MOSFET 1884 and an N-channel MOSFET 1886, connected between the positive and negative power supply voltages (the upper and lower power rails 1871, 1873). The source terminal of the P-channel MOSFET 1884 is connected to the positive power supply voltage and the source terminal of the N-channel MOSFET 1886 is connected to the negative power supply voltage. The drain terminals of the P-channel MOSFET 1884 and N-channel MOSFET 1886 and connected together. The gate terminals of both the P-channel MOSFET 1884 and N-channel MOSFET 1886 are connected to the lower power rail 1873 (the negative power supply voltage) via the third inductor 1888 (mentioned previously). In other words, one end of the third inductor 1888 is connected to the gate of the two MOSFETs 1884, 1886, and the other end of the third inductor 1888 is connected to the negative side (negative power rail 1873). Although the switching circuit is described with MOSFETs acting as the first and second switching elements 1884, 1886, in some preferred embodiments transistors other than MOSFETs may be used.

The third inductor 1888 is also coupled to the first inductor 1808 in the primary side 1802, in a similar fashion as the second inductor 1854. Therefore, in the above described configuration, a transformer for signal transmission is formed by the first inductor 1808 and the third inductor 1888, and a transformer for power transmission is formed by the first inductor 1808 and the second inductor 1854, all within the same circuit (the integrated gate signal and power circuit 1800).

The integrated gate signal and power circuit 1800 may be used as a gate driver circuit for a power switch (for example, the power switch device 1702 of FIG. 17) by connecting the gate of the power switch to an output 1890 at the midpoint between the drain terminals of the P-channel MOSFET 1884 and N-channel MOSFET 1886, and by connecting the source terminal of the power switch to the midpoint of voltage dividing element 1874 (the pair of capacitors 1874).

In use, a high or low signal is received at the PWM terminal of the gate driver 1804 in the primary side 1802, to control the buck converter of the primary side 1802. The input voltage $V_{IN}$ is stepped down by the buck converter, in similar fashion to the previous preferred embodiments, to produce the voltage $V_{OUT1}$ after the first inductor 1808. The first inductor 1808 induces a voltage in both the second inductor 1854 and the third inductor 1888. In some preferred embodiments, the voltage can be stepped up by the winding ratio of the first inductor 1808 and the second inductor 1854 (the transformer for power transmission). Similarly, in some preferred embodiments, the voltage can be stepped up by the winding ratio of the first inductor 1808 and the third inductor 1888 (the transformer for signal transmission).

For the power transmission, the voltage induced in the second inductor 1854 (the waveform transmitted by the first inductor 1808 and the second inductor 1854) is converted into $V_{OUT2}$ by the rectifier circuit 1856 and the filter circuit of the fourth inductor 1858. However, $V_{OUT2}$ is not stable because of the PWM signal input into the gate driver 1804, and the lack of a control loop. The boost converter 1870 therefore stabilizes and (further) steps up the power supply voltage that is output by the boost converter 1870. The output unit 1872 then takes the boost converter output and converts this into positive and negative power supply voltages as described above. The output voltage of the boost converter 1870 and the positive and negative power supply voltages are chosen based on the requirements of the power switch that is being controlled, for example, a SiC, IGBT, GaN, or MOS. The source of the power switch is connected to the midpoint of the voltage dividing element 1874 and is typically defined as 0 V or connected to ground. The gate of the power switch in connected to either the positive or negative power supply voltage, depending on the state of each of the first switching element 1884 (P-channel MOSEFET) and the second switching element 1886 (N-channel MOSFET), as discussed below.

For the signal transmission, the voltage induced in the third inductor 1888 (the waveform transmitted by the first inductor 1808 and the third inductor 1888) controls which of the first switching element 1884 and second switching element 1886 is on or off at any given time. In other words, the switching circuit selectively connects either of the positive or negative power supply voltages to the output 1890 located between the switching elements 1884, 1886 that the gate of a power switch is connected to in use. The PWM signal input into the primary side at the IC 1804 affects the voltage induced in the third inductor 1888, and therefore, ultimately controls the switching circuit. Depending on which of the first and second switching elements 1884, 1886 is on or off, either the positive power supply voltage or the negative power supply voltage is supplied between the source and gate of the power switch, in order to turn the power switch on or off.

The sixteenth preferred embodiment provides a circuit that integrates power transmission and signal transmission. Because the transformer for power transmission and the transformer for signal transmission are integrated into one single unit, unlike in the prior art circuit of FIG. 17, the circuit can be miniaturized. Moreover, as before, the isolated DC-DC converter does not require use of a gapped core to prevent saturation in the transformer, and the ripple voltage and noise in the isolated output $V_{OUT2}$ will be reduced.

Figure 19:
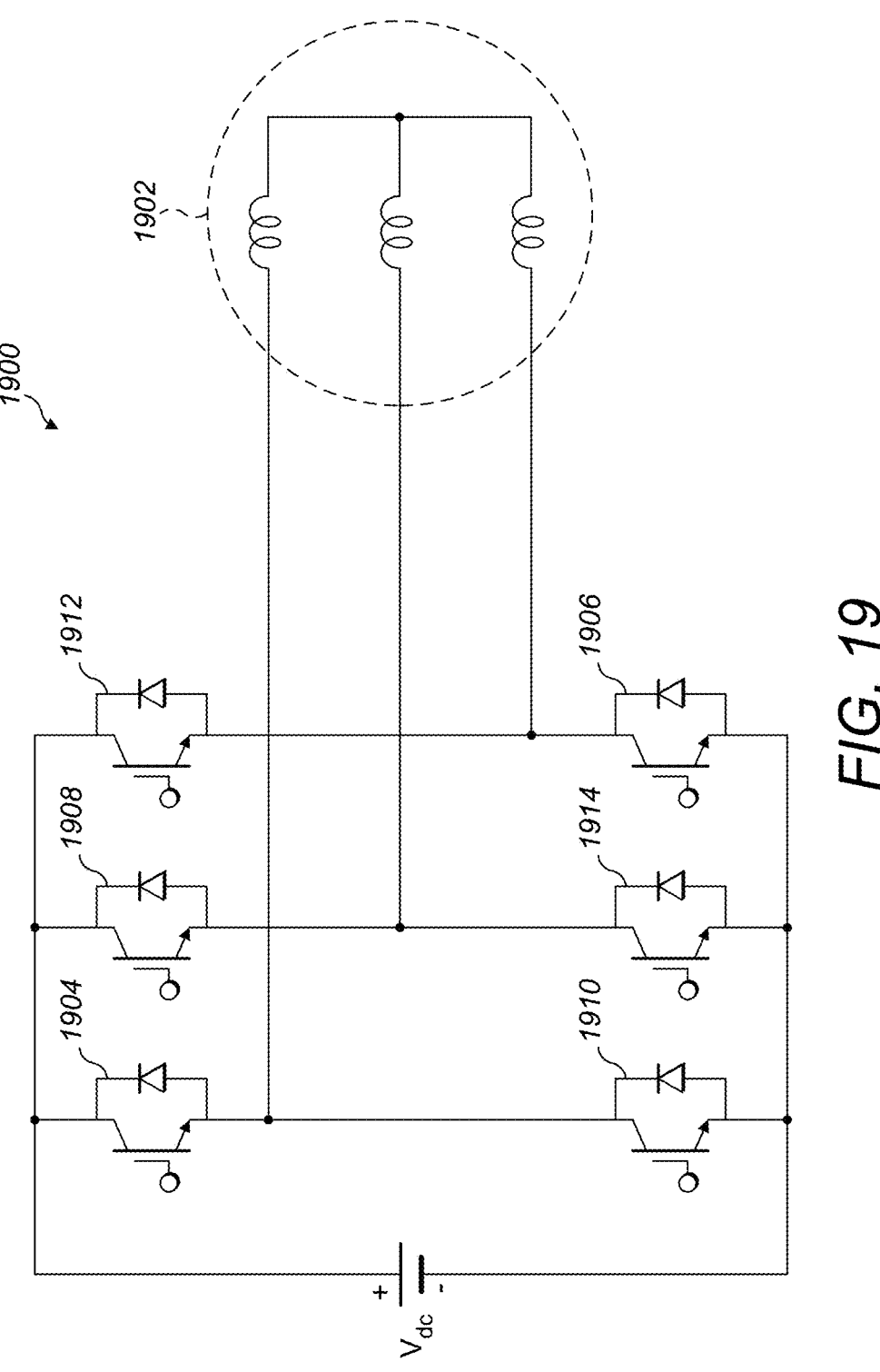
FIG. 19 shows an example of a power switch system that can be controlled by the integrated gate signal and power circuit of FIG. 18.

FIG. 19 shows one example of a power switch system that can be controlled by the integrated gate signal and power circuit 1800 of FIG. 18 (the sixteenth preferred embodiment). FIG. 19 shows an inverter circuit 1900, specifically a three phase voltage source inverter, for controlling an induction motor 1902. The inverter circuit 1900 includes six power switches 1904, 1906, 1908, 1910, 1912, 1914. Each of these power switches 1904, 1906, 1908, 1910, 1912, 1914 will be driven by a separate gate driver circuit, such as the integrated gate signal and power circuit 1800 of the sixteenth preferred embodiment. Each of the gate driver circuits supplies power and gate control signals to the respective power switch, whilst maintaining insulation from the large voltage $V_{dc}$ input into the inverter circuit 1900. In more detail, the source terminal of each of the switches 1904, 1906, 1908, 1910, 1912, 1914 would be connected to the midpoint of the voltage dividing element 1874 in the respective integrated gate signal and power circuit 1800, and the gate terminal of each of the switches 1904, 1906, 1908, 1910, 1912, 1914 would be connected to the output 1890 at the midpoint between the first and second switching elements 1884, 1886. In a particular configuration, the source terminals of power switches 1910, 1914, and 1906 in FIG. 19 would be connected to ground, whereas power switches 1904, 1908, and 1912 would not.

The preferred embodiments above describe various arrangements for isolated DC-DC converters formed using a buck or boost converter as a primary side and an isolated secondary side, that do not require use of a gapped core to prevent saturation in the transformer. Moreover, energy is provided to the isolated output voltage on the secondary side during both the on and off period of the primary side converter, and therefore, the ripple voltage and noise in the isolated output will be reduced. Furthermore, a dedicated IC is not required, instead various non-isolated DC-DC converter ICs can be used. Therefore, the cost of the isolated DC-DC converter can be reduced.

Various modifications to the described preferred embodiments are possible, as would be understood by those skilled in the art. For example, various types of diodes other than those shown in the described preferred embodiments can be used in the secondary side, for example, Schottky diode, Zener diodes, or the like. Moreover, field effect transistors (FETs) can be used instead of diodes in the rectifying circuits of the secondary sides of each of the preferred embodiments. FETs with controllers may be used, or alternatively in the case of a self-driven synchronous FETs rectifier, controllers are not required. Using FETs for synchronous rectification can improve the efficiency of the secondary side. In general, any full wave rectifying circuit could be used in the secondary side.

Throughout the described preferred embodiments polarized or non-polarized capacitors may be used interchangeably. Moreover, an air core could be used in the described preferred embodiments instead of a magnetic core.

As mentioned previously, any buck or boost converter can be used in the primary side, not just the specific step-down and boost IC examples given. Although the preferred embodiments include both an isolated output terminal and a non-isolated output terminal, the isolated DC-DC converter may in some preferred embodiments only include the isolated output terminal. In other words, in some preferred embodiments, the non-isolated output voltage $V_{OUT1}$ may not be output to an external output terminal, such as the output terminal 216 of FIG. 2, but instead the voltage $V_{OUT1}$ would be found on the internal circuitry of the isolated DC-DC converter only. In this case the DC-DC converter would include an output terminal for the isolated output voltage $V_{OUT2}$ only.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An integrated gate signal and power circuit comprising:
    an isolated DC-DC converter comprising:
        a primary side including a non-isolated DC-DC converter including a first inductor, a switch controller, and first and second switches, wherein the non-isolated DC-DC converter is configured to receive an input voltage; and
        a secondary side including a second inductor, a full wave rectifying circuit, and a filter circuit; wherein the second inductor in the secondary side is coupled with the first inductor in the primary side to define a transformer; and the secondary side is electrically isolated from the primary side by the transformer and is configured to output a DC output voltage based on a voltage induced in the second inductor of the transformer;
    a boost converter configured to receive the DC output voltage output by the secondary side of the isolated DC-DC converter;
    a voltage generator configured to generate positive and negative power supply voltages from an output voltage received from the boost converter; and
    a switching circuit configured to selectively connect either of the positive or the negative power supply voltages to an output; wherein
    the switching circuit is controlled by a third inductor that is in the secondary side and that is coupled with the first inductor in the primary side to define an additional transformer.

2. The integrated gate signal and power circuit of claim 1, wherein the output unit includes:
    upper and lower power rails that receive the output voltage from the boost converter;
    a voltage divider that is connected between the upper and that lower power rails and that is configured to convert the output voltage from the boost converter into the positive and the negative power supply voltages; and
    a shunt regulator or Zener diode configured to set one of the positive and the negative supply voltages at a first predetermined voltage value.

3. The integrated gate signal and power circuit of claim 2, where the switching circuit includes a first switching element and a second switching element connected between the upper and the lower power rails.

4. The integrated gate signal and power circuit of claim 3, wherein a first end of the third inductor is connected to a gate terminal of each of the first and the second switching elements, and a second end of the third inductor is connected to the negative power rail.

5. The integrated gate signal and power circuit of claim 1, wherein the third inductor controls the switching circuit based on a voltage induced in the third inductor via the first inductor.

6. The integrated gate signal and power circuit of claim 1, wherein the second inductor is coupled with the first inductor via a magnetic core.

7. The integrated gate signal and power circuit of claim 6, wherein the magnetic core is a non-gapped core.

8. The integrated gate signal and power circuit of claim 1, wherein the second inductor is coupled with the first inductor via an air core.

9. The integrated gate signal and power circuit of claim 1, wherein:
    the filter circuit includes a capacitor; and
    the isolated DC-DC converter further includes a duty regulating circuit that is configured to maintain the duty cycles of the first and the second switches at 50% or approximately 50%.

10. The integrated gate signal and power circuit of claim 9, wherein:
    the duty regulating circuit includes an amplifying circuit; and
    the amplifying circuit is configured to sense the input voltage and an output voltage of the primary side and to output a feedback signal to the primary side to maintain the duty cycles at 50% or approximately 50%.

11. The integrated gate signal and power circuit of claim 9, wherein the input voltage is connected directly to the first inductor in the primary side.

12. The integrated gate signal and power circuit of claim 9, wherein the first and the second switches and the switch controller are included in a switched-mode power supply integrated circuit (IC);

the IC includes a feedback terminal which controls an output voltage of the non-isolated DC-DC converter; and the feedback signal output by the duty regulating circuit is coupled to the feedback terminal.

13. The integrated gate signal and power circuit of claim 1, wherein the first and second switches and switch controller are included in a switched-mode power supply integrated circuit (IC); and the IC includes a feedback terminal which controls an output voltage of the non-isolated DC-DC converter.

14. The integrated gate signal and power circuit of claim 13, wherein:

the primary side further includes a duty compensation circuit coupled to the feedback terminal; and the duty compensation circuit is configured to increase the duty cycle of one of the first and second switches to improve load regulation of the DC output voltage of the secondary side.

15. The integrated gate signal and power circuit of claim 14, wherein:

the IC includes a voltage input terminal;

the duty compensation circuit includes a resistor;

the input voltage is connected between the voltage input terminal and the resistor; and the feedback terminal is configured to sense the voltage drop over the resistor.

16. The integrated gate signal and power circuit of claim 15, wherein the duty compensation circuit further includes an amplifier circuit which is configured to amplify the voltage drop over the resistor and to transmit an amplified signal to the feedback terminal.

17. The integrated gate signal and power circuit of claim 1, wherein the full wave rectifying circuit either is:

full wave bridge rectifier; or a center-tapped full wave rectifier including a center-tap on the second inductor, a first diode connected to a first end of the second inductor, and a second diode connected to a second end of the second inductor.

18. The integrated gate signal and power circuit of claim 1, wherein the full wave rectifying circuit includes one of more field effect transistors (FETs) configured as synchronous rectifiers.

19. The integrated gate signal and power circuit of claim 9, wherein the full wave rectifying circuit includes either a voltage doubler circuit or a voltage quadrupler circuit.

* * * * *